US010055079B1

(12) United States Patent
Kitchin et al.

(10) Patent No.: US 10,055,079 B1
(45) Date of Patent: Aug. 21, 2018

(54) DURABLE YET SENSITIVE TOUCH SCREEN ASSEMBLY AND METHODS FOR MAKING SAME

(71) Applicant: Cottonwood Creek Technologies, Inc., Centennial, CO (US)

(72) Inventors: Dwight W. Kitchin, Parker, CO (US); Alan K. Schott, Centennial, CO (US)

(73) Assignee: COTTONWOOD CREEK TECHNOLOGIES, INC., Centennial, CO (US)

( * ) Notice: Subject to any disclaimer, the term of this patent is extended or adjusted under 35 U.S.C. 154(b) by 0 days.

(21) Appl. No.: 15/630,167

(22) Filed: Jun. 22, 2017

Related U.S. Application Data

(63) Continuation of application No. 14/597,429, filed on Jan. 15, 2015, now abandoned.

(60) Provisional application No. 61/927,879, filed on Jan. 15, 2014.

(51) Int. Cl.
*G06F 3/045* (2006.01)

(52) U.S. Cl.
CPC .... *G06F 3/045* (2013.01); *G06F 2203/04102* (2013.01); *G06F 2203/04103* (2013.01); *G06F 2203/04104* (2013.01)

(58) Field of Classification Search
None
See application file for complete search history.

(56) References Cited

U.S. PATENT DOCUMENTS

| | | | | | |
|---|---|---|---|---|---|
| 4,963,417 | A | * | 10/1990 | Taniguchi | G06F 3/045 178/18.01 |
| 2013/0321490 | A1 | * | 12/2013 | Clark | G09G 3/3406 345/690 |
| 2014/0143707 | A1 | * | 5/2014 | Boulanger | G06F 3/0483 715/776 |
| 2014/0172622 | A1 | * | 6/2014 | Baronshin | G06F 3/0482 705/26.7 |
| 2015/0002174 | A1 | * | 1/2015 | Peng | G01D 5/2405 324/661 |
| 2015/0070309 | A1 | * | 3/2015 | Kang | G06F 3/044 345/174 |
| 2015/0145824 | A1 | * | 5/2015 | Park | G06F 3/044 345/174 |

* cited by examiner

*Primary Examiner* — Nicholas J Lee
*Assistant Examiner* — Duane N Taylor, Jr.
(74) *Attorney, Agent, or Firm* — Merchant & Gould P.C.

(57) ABSTRACT

A durable touch screen assembly including a display screen for projecting images to a viewer; an optically clear, flexible touch sensor through which the images are projected; an optically clear, flexible substrate positioned between the electronic display screen and the flexible touch sensor; a space between the flexible substrate and the electronic display screen sufficient to enable the substrate and the touch sensor to flex; and a durable polycarbonate protective layer at least about 0.01 inch thick attached in front of the touch sensor substantially free of intervening features that would impair visibility.

20 Claims, 14 Drawing Sheets

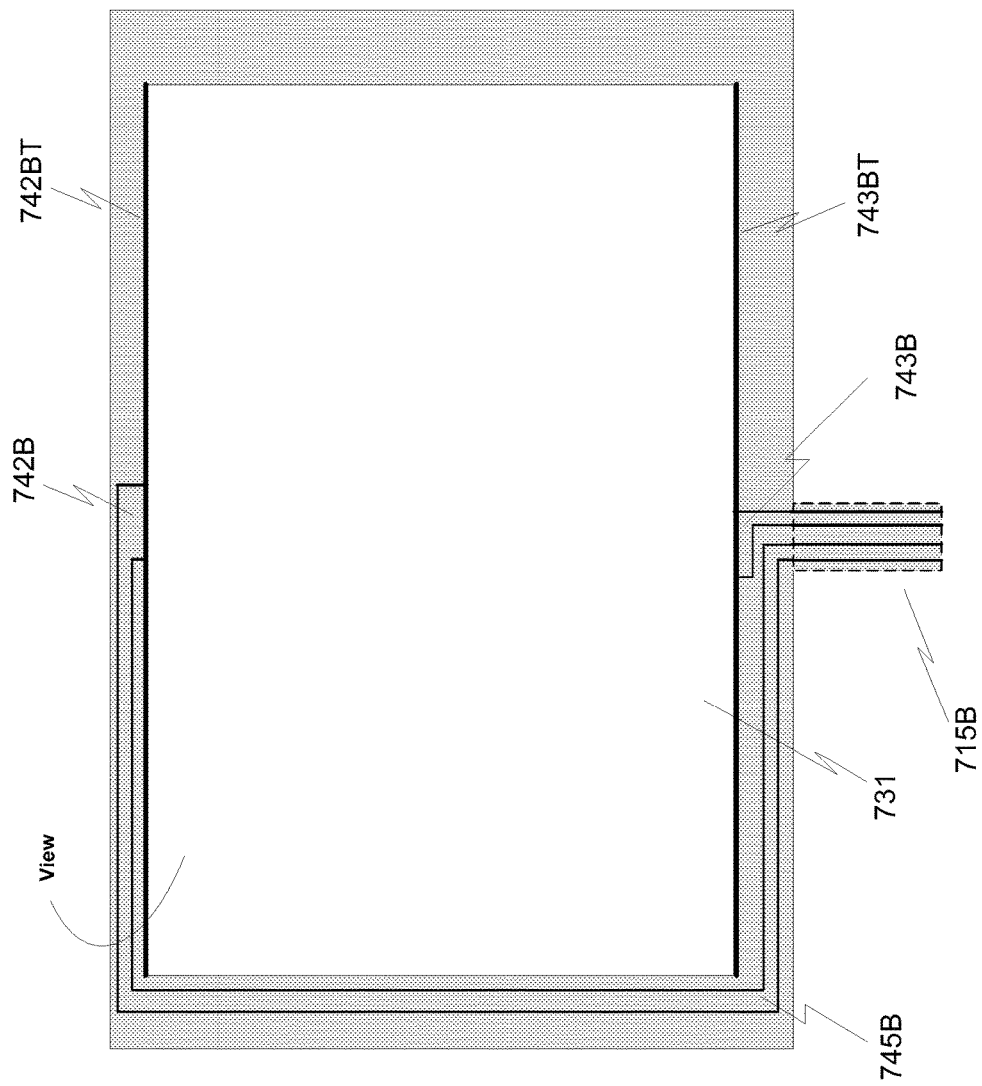

DURABLE YET SENSITIVE TOUCH SCREEN ASSEMBLY AND METHODS FOR MAKING SAME

PRIORITY CLAIM

This application is a continuation of U.S. application Ser. No. 14/597,429, titled "DURABLE YET SENSITIVE TOUCH SCREEN ASSEMBLY AND METHODS FOR MAKING SAME", filed Jan. 15, 2015, which claims priority from Provisional Patent Application Ser. No. 61/927,879 filed on Jan. 15, 2014, which are incorporated by reference in their entirety herein. To the extent appropriate, priority is claimed to the above referenced applications.

INTRODUCTION

Although the concept of a "touch screen" was envisioned decades ago, touch screen technology has only recently advanced to allow it to be efficiently and effectively employed by users to reliably direct the operations of an electronic device. Enhanced touch screen technology has contributed to the popularity of smart phones, tablets and other small electronic devices by allowing a user to rapidly select and deploy the robust functionality now available in such devices. Hardware manufacturers are now designing "touch screen" technology into computer monitors to satisfy the demands of consumers who have become accustomed to using touch screens in hand-held devices and would prefer not to manipulate a computer keyboard or mouse to select and direct their computer's operations. Locating a finger or other object against the touch screen enables the user to directly select computer functionality without a peripheral device. The demand for and use of touch screens is expected to expand significantly.

There are several principal types of technology employed in commercial touch screens: "capacitive," "projected capacitive," and "resistive." Other technologies, such as "infrared," "optical", and "surface acoustic wave" ("SAW") have been postulated and tried, but are not known to have made significant inroads into commercial applications as alternatives to "touch screens."

A "capacitive" touchscreen panel consists of an insulator such as glass, coated with a transparent conductor. As the human body is also an electrical conductor, touching the surface of the screen results in a distortion of the screen's electrostatic field, measurable as a change in capacitance. A number of technologies may be used to make measurements which can be processed by a controller to determine the location of the touch. Unlike a resistive touchscreen, however, one cannot activate a capacitive touchscreen when wearing most types of electrically insulating material, such as gloves. This disadvantage especially affects usability in consumer electronics, such as touch tablet PCs and capacitive smartphones, when deployed in cold weather. It can be overcome with a special capacitive stylus, or a special-application glove with an embroidered patch of conductive thread passing through it and contacting the user's fingertip. And while capacitive touch screen technology is effective in smaller devices, it has not been scalable generally to larger devices, e.g., external computer monitors, with the same degree of touch "resolution."

A "projected capacitive" touch screen uses a variant of capacitive technology. It uses a matrix of rows and columns of conductive material, layered on sheets of glass, such as by etching, to form a grid. If a finger bridges the gap between two of the "tracks," the charge field is interrupted and detected by the controller. Because the capacitance can be changed and measured at every individual intersection on the grid, this system is able to detect touches very accurately, i.e., it is said to have a high "resolution." In addition—unlike traditional capacitive touch technology—it is possible for a projected capacitive system to sense a passive stylus or a gloved finger. However, moisture on the surface of the panel, high humidity, or collected dust can interfere with the performance of a projected capacitive touch screen.

"Resistive" touch screen technology uses sensors comprising two parallel membranes. When the membranes are pushed or otherwise contacted together, an electrical contact point is created on each of the membranes. It is possible then to measure characteristics proportional to the position of the mutual contact point relative to the limits of each membrane, that is, the proportion of the overall X and Y distances as a percentage of the limits for each respective membrane. Commonly available resistive touch sensors employ 4-, 5-, or 8-wire connections to the related external controller or processor to provide electrical connectivity to the electrical contacts internal to the overall resistive sensor assembly. Drivers on the X and Y coordinates of the touch sensor measure each percentage, respectively and translate this signal into a protocol that is interpreted by the host microprocessor, thereby creating the appropriate input response. The main advantages of the resistive-type of sensor are that they: are less expensive; require less electrical power to operate, and detect contact devices other than just fingers.

With controllers and/or processors programmed to do so, standard resistive touch sensors can detect that more than one contact point exists if a user accidentally or intentionally causes two or more, contact points, but the resolution of the positions of the contact points is considerably less than that of a single contact. There is also a class of resistive touch sensors designed specifically to handle many simultaneous touch contact points by effectively dividing the touch sensitive area into a larger number of subsections each of which effectively acts as its own individual, albeit smaller, resistive touch sensor. Such sensor panels may have up to 100, or more, internal electrical contact points and perhaps as many external electrical connections. These resistive multi-touch sensors generally require a controller with significantly greater complexity to manage, read, and report the current status of the individual small area sensors along with more complex processor algorithms to take advantage of the larger number of simultaneous sensor reports. However, a particular advantage of resistive controllers for single or multi-touch sensors is that it is relatively easy to add resistive controller capacity to provide increased resolution at relatively low incremental cost. Thus, it is possible to construct very large resistive sensors with almost arbitrarily high resolution. This is impossible, in a practical sense, using capacitive technologies and even more difficult utilizing alternative technologies.

Regardless of whether the touch screen uses capacitive, projected capacitive or resistive technology, commercial touch screens typically employ one or more additional layers superimposed over the contact portion of the touch sensor. These coatings or "masks" are employed to protect the touch screen, to prevent dust and other contaminates from entering the touch screen assembly, to enhance abrasion and scratch resistance, to prevent damage by inhibiting access by ultraviolet light, and to reduce glare as a user attempts to discern images on the touch screen under various lighting conditions. Typically, these additional layers include at least one thin layer of glass or hard plastic that provides a barrier to deter fingers or other objects from protruding into or otherwise damaging (e.g., cracking or chipping) the touch sensor itself.

In designing a composite touch screen assembly, comprising an electronic display (e.g., LCD), touch sensor and protective layers, a number of competing considerations must be balanced. Among these are expense, ease of manufacture, touch screen "sensitivity," touch screen "resolution" (i.e., accuracy in locating the touch) and touch screen protection. Flexibility of the various individual layers of material facilitates construction; but structural integrity, durability, and stiffness of the layers assist in preventing intrusion and enhancing longevity of use. Similarly, the ability of the touch screen to detect a soft touch (i.e., "sensitivity") and its ability to precisely identify the location of the touch (i.e., "resolution") may be inversely affected by thicker, durable outer coverings employed for protection or other purposes. Indeed, it has been generally believed—prior to the present invention—that a thick, durable protective layer (i.e., a layer thicker than a few thousandths, usually less than 5 to 10 thousandths of an inch thick) could not be employed over a touch sensor, because it would negate or significantly reduce the sensitivity and/or accuracy of the touch sensor. Such a thick protective layer would also present manufacturing difficulties. In particular, methodology did not exist for enabling the adhesive lamination of a thick protective layer with the front side of a touch sensor without trapping air "bubbles" or causing other issues or features that would distort or impair visibility. Finally, it is desirable to provide a touch screen assembly that minimizes power consumption during operation. All of the foregoing features, attributes and considerations must be further balanced in the context of product cost, performance and durability.

For the foregoing reasons, a typical smartphone uses glass for the outer surface of the touchscreen. Glass scratches and fractures easily. And according to some, the largest single source of warranty claims on smart phones and tablets is damage, i.e., breakage, cracking, chipping, abrasion and/or scratching, of the protective layer(s) over the touch screen. This occurs because a relatively thin layer of glass is typically used as the outer layer on the touch screen for the reasons noted previously. Damage to the outer glass layer, may result in damage to the touch screen or other internal electronics of the device. Damage and breakage inevitably occur despite the efforts of many owner-users to guard against such injuries to their smart phones. Thus, the possibility of damaging a typical touch screen is somewhat inevitable.

The risk of damage is further increased in situations where the touch screen is deployed for access by multiple, non-owner users, where the frequency of use is higher and the motivation for using care is less. This occurs, for example, with touch screens deployed in equipment, such as kiosks and ATM machines, available to the public. Indeed, in some environments there is not only a risk of accidental damage, but the possibility of intentional abuse being inflicted on the touch screen assembly or the electronic device of which it is a part.

In an extreme situation, touch screens are now being deployed in electronic devices available to prisoners in penal institutions. For example multi-faceted electronic devices may be used to deliver telephone service, remote visitation services, access to commissary accounts and transactions, internet access and other services. These may be accessed through menus displayed on the touch screen of the device. The design of these electronic devices requires special attention to any external or internal feature that: (a) can be subject to misuse harmful to a person or (b) can be subject to either accidental or intentional misuse harmful to the electronic device. Traditionally, considerations of safety and durability have led to special designs for even ordinary items such as beds, toilets and sinks located in prison cells or elsewhere on the premises of a penal institution.

The difficulty in designing a touch screen display for use under these conditions is that most solutions that would provide maximum durability would impair or totally negate the sensitivity of the screen and/or its ability to accurately detect the position of a finger or instrument positioned to activate it. Thus, durability and/or sensitivity/resolution must be compromised. A design that would provide maximum durability is unusable as a touch screen; a design that provides a sensitive and accurate touch screen would not provide appropriate durability. These design problems are further exacerbated by considerations of manufacturing ease (e.g., durable materials are generally not flexible) and expense. Durable touch screens used, for example, in ATM machines deployed by a financial institution are just too expensive to be deployed in a prison where the use of public funds is closely monitored. "Gorilla Glass®" (a registered trademark used for a glass available from Corning, Inc., Corning, N.Y.) employed to provide some abrasion and smudge resistance on smart phones just does not provide enough durability for other environments.

Thus, the need exists for a touch screen assembly that is highly durable, is sensitive to the touch, has a high resolution, is easily manufactured and is relatively inexpensive. Also, in many applications, the touch screen should minimize power consumption.

SUMMARY

The deficiencies of the prior art are addressed using the device and methods described herein.

In particular, the invention enables the economical deployment of durable touch screen assemblies in environments, such as penal institutions, where the touch screen may be subject to severe abuse—both negligent and intentional. Touch screen assemblies described herein may also be useful in devices employed in public environments such as ATMs, kiosks, and display devices on seat backs in airplanes, electronic displays in hotel rooms and other applications.

Principles of the present invention and various embodiments thereof are described in the following description herein and are illustrated in the attached drawings. One skilled in the art would understand that those principles can be incorporated in a number of different embodiments and combinations.

Embodiments described herein provide durable, yet sensitive touch sensor assemblies for use in electronic devices for enabling a user to select from images depicted on the screen comprising: an optically clear, flexible touch sensor and a durable polycarbonate protective layer, the polycarbonate protective layer being at least about 0.01 inch and preferably about 0.01 to about 0.06 inch thick and being adhesively attached in front of the touch sensor so that a user touch to the durable polycarbonate protective layer activates the touch sensor. The protective layer may also be attached such that the assemblies are substantially free of intervening air bubbles or other features that would distort or otherwise impair visibility. The outer polycarbonate protective layer provides abrasion resistance to sharp, "pokey" objects, and scratching. It also provides an initial line of resistance to hammer-like blows to its surface. Severe blows are also muted by other aspects of the touch screen assembly as will be evident from the constructions described and depicted herein.

The invention also provides other significant enhancements. The touch screen assembly in embodiments described herein is at least as sensitive to the touch as sensors with little if any protective laminate. Prior to the present invention, one of ordinary skill in the art would have expected that the placing of a finger on a thick protective layer above the touch sensor would not be detected by the underlying sensor and/or the location of the "touch" would not be accurately identified by the sensor.

Further durability can be provided in a touch screen assembly comprising the following components:

(a) a display screen for projecting images to a viewer;

(b) an optically clear, flexible touch sensor through which the images are projected by the display screen, wherein the touch sensor has a front side facing opposite the display screen;

(c) an optically clear, flexible substrate positioned between the display screen and the flexible touch sensor to support the flexible touch sensor;

(d) a space between the flexible substrate and the display screen sufficient to enable the substrate and the touch sensor to flex toward the display screen in response to an impact to the touch screen assembly; and (e) a durable polycarbonate protective layer, the polycarbonate protective layer being at least about 0.01 inch thick and being attached in front of the touch sensor so that a user touch to the durable polycarbonate protective layer activates the touch sensor. The protective layer may be attached such that the assembly is substantially free of intervening features between the polycarbonate protective layer and the touch sensor that would impair visibility As illustrated and described herein, embodiments of the present invention can incorporate other arrangements of features that provide an improved touch screen assembly.

The touch screen assemblies described herein can be achieved through improved methods of assembling or laminating certain components with respect to one another. In part, these include procedures for enabling: (a) the adhesive lamination of the touch sensor to its backing and (b) the lamination of a thick polycarbonate protective layer with the front side of the touch sensor without entrapping air bubbles or creating other features that would distort or otherwise impair visibility.

The foregoing "summary" is not intended to be comprehensive and is not intended to identify "key" or essential features of the invention. The summary is provided only to introduce and to generally describe some of the aspects of the present invention which is described more fully in the entirety of the written description and drawings in this application. Accordingly, the summary should not be used to narrow the scope of the invention.

BRIEF DESCRIPTION OF THE DRAWINGS

Non-limiting and non-exhaustive embodiments of the invention are illustrated with reference to the following drawings.

FIGS. 7A and 7b show the location of the electronic "contacts" in the active layers of a resistive touch sensor in one embodiment of the present invention. FIG. 7A is a top view showing one arrangement of the "contacts" associated with the upper film layer of such a touch sensor assembly. FIG. 7B is a top view showing one arrangement of the "contacts" associated with the top of the very thin sheet of glass or plastic on the lower portion of such a touch sensor assembly.

FIG. 8 illustrates a method for applying an optically clear adhesive to a substrate.

FIG. 9 illustrates a method for adhesively laminating a touch sensor assembly to the substrate and adhesive such as that resulting from the procedure in FIG. 8. FIG. 9A is a window into the process depicted in FIG. 9 showing in more detail the movement of adhesive in advance of lamination.

FIG. 10 illustrates a method for applying an optically clear adhesive to a laminate comprising a substrate and touch sensor assembly such as that resulting from the procedure shown in FIG. 9.

FIG. 11 illustrates a method for adhesively laminating a coated protective layer to a substrate and touch sensor assembly such as that resulting from the procedure shown in FIG. 10.

It should be noted that the accompanying drawings are not precisely to scale, particularly as to the relative thickness of various laminate components to one another, but are intended to illustrate relative relationships of certain components to one another. The drawings are not intended to be exhaustive of all aspects of any embodiment or to illustrate all possible embodiments of the present invention. Note that like items in multiple drawings may have like reference numbers.

DETAILED DESCRIPTION

Aspects of the present invention may be further understood with reference to the following detailed description and the sample embodiments depicted in the accompanying drawings.

Figure 1:
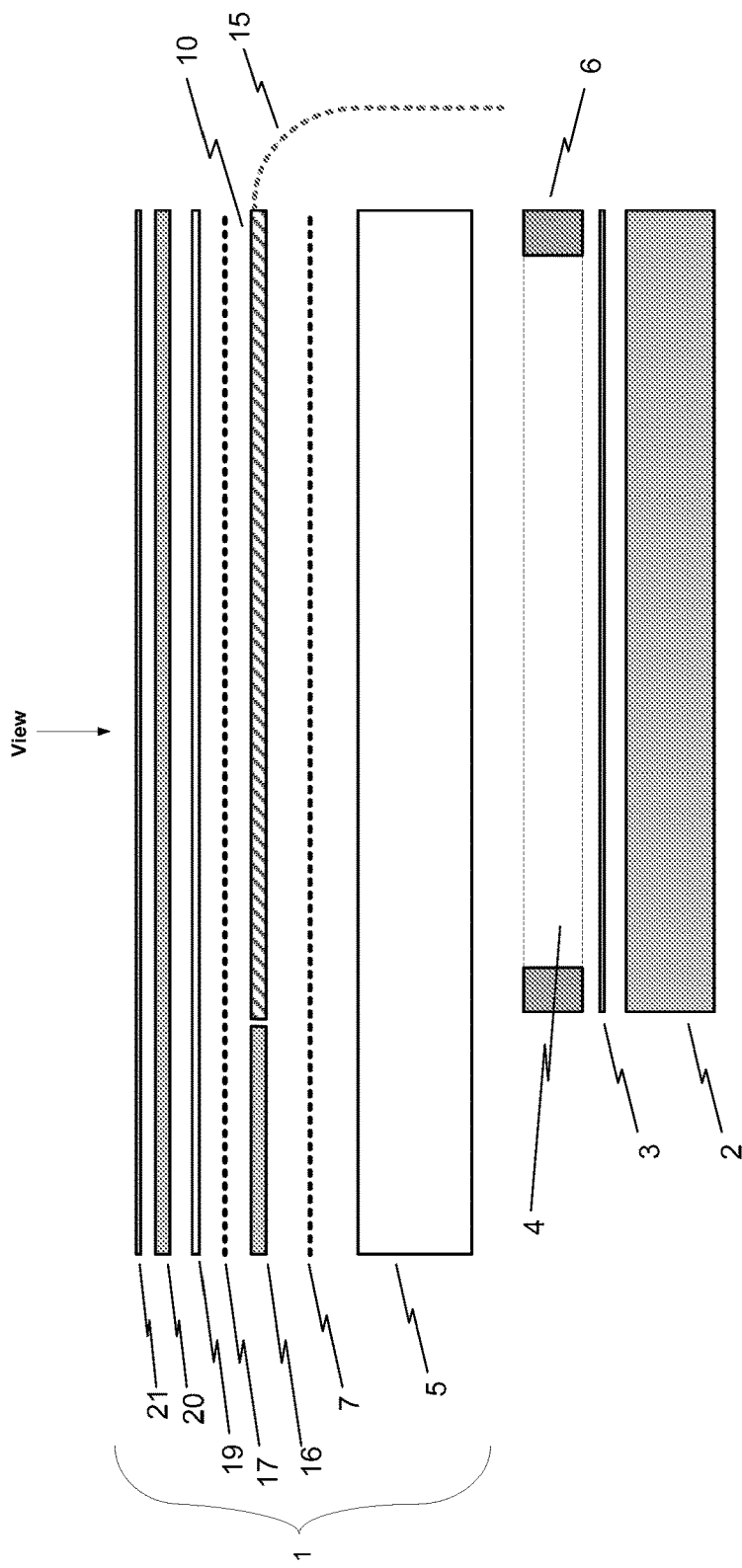
FIG. 1 is an "exploded" side view illustrating the construction of a touch screen assembly according to one embodiment including a touch screen sensor as a component.

Touch Screen Assembly:

FIG. 1 depicts a side view of a touch screen "laminate" assembly 1 comprising features of one embodiment of the present invention. As the diagram in FIG. 1 indicates, one embodiment of the composite touch screen assembly 1 is comprised of a number of components laminated or "layered" on top of one another. As described herein, the layers of the touch screen are referenced according to how they would appear in an electronic device with the "top" or "outermost" layer, i.e., being the one that is accessible to the touch of a user or an instrument manipulated by the user, and the "bottom" or "innermost" layer, i.e., being the other side of the assembly, frequently nearest the inner parts of the electronic device. Typically, a viewer would see the "top" or "outermost" layer, as depicted on FIG. 1. It must be understood, however, that these terms are used only to indicate the relative orientation of the layers with respect to one another in the array and do not necessarily connote an absolute orientation.

As used herein, a "touch screen" typically includes a touch sensor, i.e., a device for detecting a human and/or inanimate touch (depending on the technology employed in the sensor) and a display screen (such as an LCD) for projecting images (typically readable through the touch sensor) to be viewed by the user. Typically, the touch screen sensor is integrated with a display device for presenting various images to the user which will correspond with active areas on the screen for observation and selection by the user. In essence, the electronic display is the "output" and the touch sensor is the input.

The touch screen assembly 1 shown in FIG. 1 is deployed above an electronic display screen 2 for depicting images to a user. As used herein "image" can mean any visual information presented on an electronic display, such as letters, numbers or other symbols, graphics, pictures, animations or moving pictures, or combinations thereof such as are presented on "web pages," and material generated by programs accessible by the electronic device. The electronic screen may be an LCD, OLED, eInk or other primary image presentation device or an image plane related to an image projection system, for example, a DLP, laser or other indirect image presentation mechanism. Typically, the other layers of the touch screen assembly described below are sufficiently "clear" optically, so that the images generated by the display screen 2 can be seen by the user through these other layers of the assembly.

Above the electronic display 2 is a "substrate" layer 5 that supports the other laminate strata superimposed above it. This is a base layer for the assembly, and when mounted in an electronic device, is on the inner-most side of the touch panel assembly above the display 2. The substrate layer provides structural support for the touch screen assembly and provides resistance to blows or other heavy forces applied, for example, to the outermost or top layer. Thus, the substrate layer 5 prevents the effect of a blow or other force being transmitted to the electronics or other items below the substrate in the electronic device. The substrate member 5 should be firm to prevent the touch sensor from excessive flexing, but it may also be slightly flexible to help absorb a blow or shock to the surface of the touch screen. Flexibility may also assist in the fabrication of the composite touch screen assembly 1 without compromising necessary structural qualities needed to perform its ultimate function. In addition, in the event that a severe force is applied to the outermost layer of the touch screen assembly, substrate 5 may bend inward thereby cushioning the impact. This cushioning effect can be further enhanced if there is a space 4 between the substrate layer 5 and the display screen 2 permitting substrate 5 to flex to a greater extent before coming into physical contact with the display screen.

In one embodiment this additional space 4 between the substrate layer 5 and the display screen 2 may be created by mounting the display screen 2 using appropriate brackets attached to the same structural element (e.g. a chassis or housing) employed to locate and retain the touch screen assembly 1 within the housing of the application environment. (See, for example, FIG. 5) This combination assures that the relative locations of the display screen 2 and the touch screen assembly 1 are maintained without consideration of other environment elements.

Figure 5:
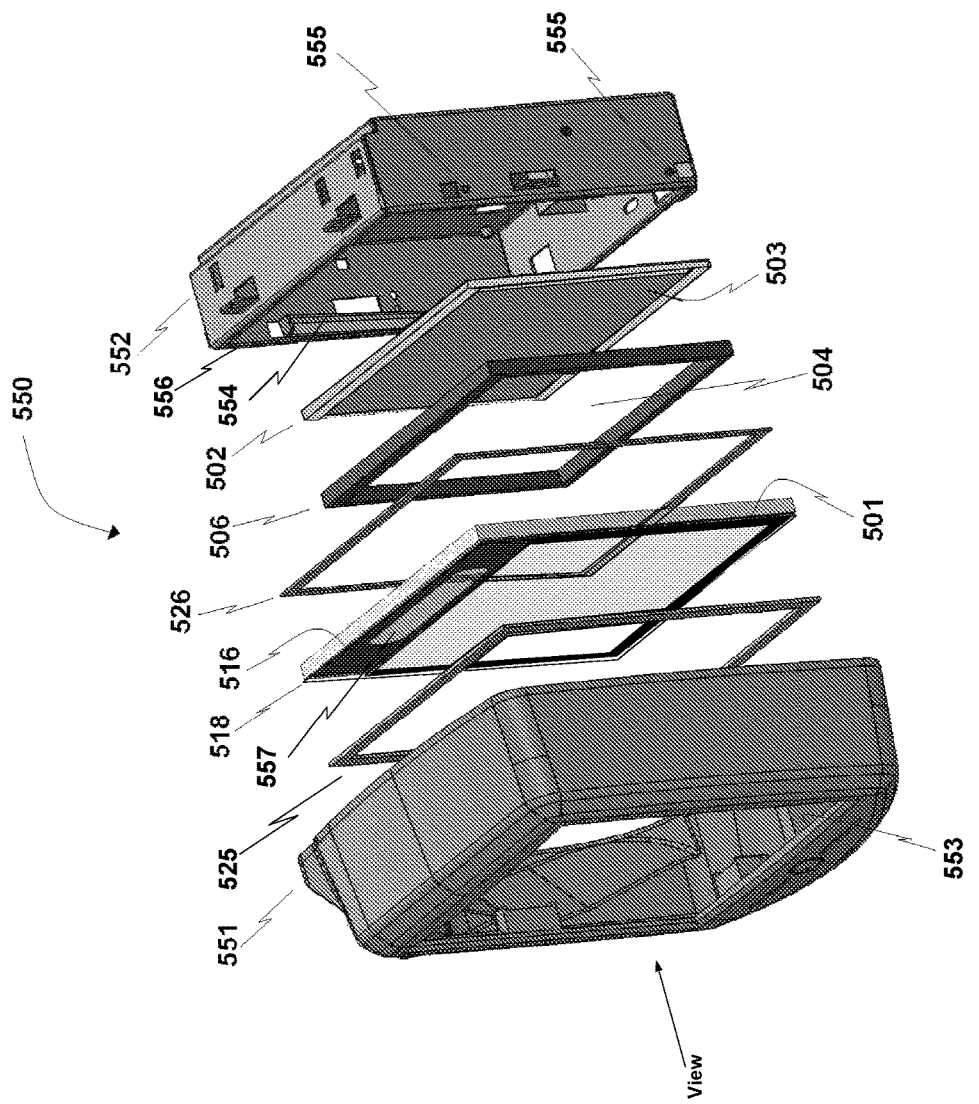
FIG. 5 is an isometric, exploded view showing one arrangement of the components of a touch screen assembly and their orientation inside the housing of a sample device for employing the touch screen.

In another embodiment illustrated in FIGS. 1 and 5 the space 4 between the substrate layer (i.e., the back of the touch sensor assembly) and the display screen is created by a "shadow box" gasket (6 in FIGS. 1 and 506 in FIG. 5) that defines and surrounds the space, provides cushioning, and keeps dust from entering the space and impairing the operation of the display device. Also in front of the display is an optional privacy filter 3 which limits the visibility peripherally of images presented by the display 2. The privacy filter is described in more detail in connection with FIG. 5 below.

In one embodiment the substrate layer consists of a layer of polycarbonate approximately 0.375 inch thick. Such a substrate is resistant to impacts and has suitable optical qualities. The substrate layer 5 could be thinner or thicker depending upon the level of impact anticipated. A practical thickness may be in the range of about 0.2 to about 0.5 inch thick for many applications. Devices utilizing 0.5 inch thick polycarbonate have been constructed and evaluated with positive optical properties exceeding expectations and superb impact handling performance. The 0.5 inch thickness was deemed to be compatible, physically and optically, for use, and testing with the 0.375 inch thick material has proven to be a practical choice. Suitable material includes a polycarbonate sold under the designation "Makrolon®," available from Sheffield Plastics, Inc., Sheffield, Pa., or "Lexan™," available from Sabic Innovative Plastics, Pittsfield, Mass.

The material employed in the substrate 5 and its thickness have a bearing on the height, i.e., thickness, of the space 4 between the substrate and the display device 2. To some extent the surface area of the substrate may also have an effect. In general, the height of the space should be sufficient to accommodate the anticipated deflection of the substrate when an impact, force or other stress is placed on it. For example, the space between the substrate and the display device may be about 0.02 to about 0.5 inch high, and the sum of that distance plus the thickness of the substrate should be at least about 0.4 inch. Thus, in the case of a polycarbonate substrate with a thickness of about 0.375 inch, a space of about 0.032 inch should permit adequate deflection of the substrate in a touch screen assembly of a size such as that depicted in FIG. 6.

"Above" the substrate layer is the touch sensor assembly 10. In one embodiment the touch sensor 10 includes coated glass and/or film-based components that sense the user's input touch using resistive-type touch sensor technology. In one embodiment, the touch screen is constructed such that the effective or usable resolution is ¼ inch square or smaller, e.g., $\frac{1}{8}^{th}$ inch square, to facilitate many types of applications using a display device and an associated touch sensor assembly. A suitable device is model "S102P1-D04.1" (i.e., a 0.7 mm thick glass substrate rather than the standard thickness glass substrate), available from PanJit Americas Incorporated, Tempe, Ariz. The touch sensor assembly 10 is described in more detail with reference to FIGS. 2 and 3.

In addition to the display component 2 and the touch sensor assembly 10, the touch screen assembly 1 may also include a backlighting mechanism that produces and transmits light through the window/spacer 16 in a direction generally perpendicular to and through the surface. A backlighting mechanism may be included in the electronic display device or elsewhere in the touch screen assembly using techniques as would be known to one of ordinary skill in the art. Backlighting enables better perception of objects displayed under various ambient lighting conditions such as dim or dark environments.

Preferably, the touch sensor assembly 10 and the window 16 are attached to the substrate 5, for example, by an adhesive layer 7. Typically, the adhesive layer 7 is an optically clear adhesive that is applied on the substrate layer 5 to bond the substrate and the touch sensor assembly 10. In one embodiment, the optically clear adhesive material is supplied as a roll of sheet material with "release paper" on each side. Other forms of release systems could be employed to preclude blocking while providing timely presentation of an active adhesive surface for bonding of components. Liquid optical bonding could also be employed, but often at much greater expense. Any adhesive may be used that is relatively easy to apply, sets up quickly, forms a lasting bond between the laminate materials, and is optically clear and is substantially distortion free. One suitable adhesive is type 9483 available from 3M Company, St. Paul, Minn. In one suitable embodiment, the adhesive is applied at a thickness of approximately 0.005 inch.

Above the touch sensor 10 is an unusually thick protection layer 20. Preferably the protection layer is made of polycarbonate in a thickness of at least about 0.01 inch and usually within the range of about 0.01 to about 0.06 inch thick and more preferably from about 0.02 to about 0.04 inch thick. One suitable form of polycarbonate is "Lexan™," available from Sabic Innovative Plastics, Pittsfield, Mass. In one preferred embodiment, the polycarbonate protective layer is about 0.02 inch thick. The protective layer resists impacts.

In embodiments, such as that depicted in FIG. 1, the protective layer or front cover may also incorporate: (a) one or more surface coatings or masks 21 on the outer surface and (b) a "black-out" mask 19 underneath. The selection and use of these coatings or masks is within the skill of the art. The black-out mask, in particular, is optional. The surface coatings 21 on the outside of the front cover 20 are applied to enhance abrasion and scratch resistance and to minimize "glare." Suitable coatings are available pre-applied to Lexan™ HP92S available from Sabic Innovative Plastics, Pittsfield, Mass. The "black-out" mask 19 is intended to visually define areas to view images from display device 2 and/or to hide edges and joints beneath, such as, locations where the window/spacer 16 abuts resistive touch sensor assembly 10. The masking 19 may also be deployed such that: (a) camera(s), or infra-red or other light sensors may "see" the area in front of the overall application environment, and/or (b) other optional lighting sources generally located behind the window/spacer 16 may signal to or illuminate the area in front of the overall application environment. A suitable "black-out" mask is "1019 MSK," available from Norcote, Crawfordsville, Ind.

The touch sensor 10 and the protection layer 20 may be bonded to one another by an optically clear adhesive 17. Suitable adhesives would have the same qualities as previously described with respect to adhesive layer 7.

A window/spacer 16 may also be included in the touch screen assembly 1 above the touch sensor as a filler strip to fill the void, as necessary, between the substrate and the protection layer. The spacer can be made of any suitable material, such as polycarbonate. As mentioned later, it may be desirable that the spacer have properties, such as flexibility, similar to the adjacent touch sensor 10. This spacer 16 may be useful because of limitations in the available size of the touch sensor 10 relative to the substrate 5 and the protective layer 19. In applications where a relatively small number of electronic devices require touch screen assemblies 1, it may be desirable to use a commercially available touch sensor, rather than a custom-sized, specially ordered touch sensor. The window/spacer serves to adjust the differences in the size of the adjacent components. This reduces the cost of the overall touch screen assembly 1.

In situations, such as depicted in FIG. 1 the area above the spacer 16 will not contain any images from the display device 2 and will be insensitive to a touch by the user. The window/spacer may still be useful to transmit internally generated light such as from colored informational LEDs of appropriate configuration or higher intensity fill light or to facilitate image or video capture by camera(s) also located generally behind the window/spacer. Ambient light sensors and/or infra-red sensors may also be advantageously located generally behind the window/spacer.

Figure 13:
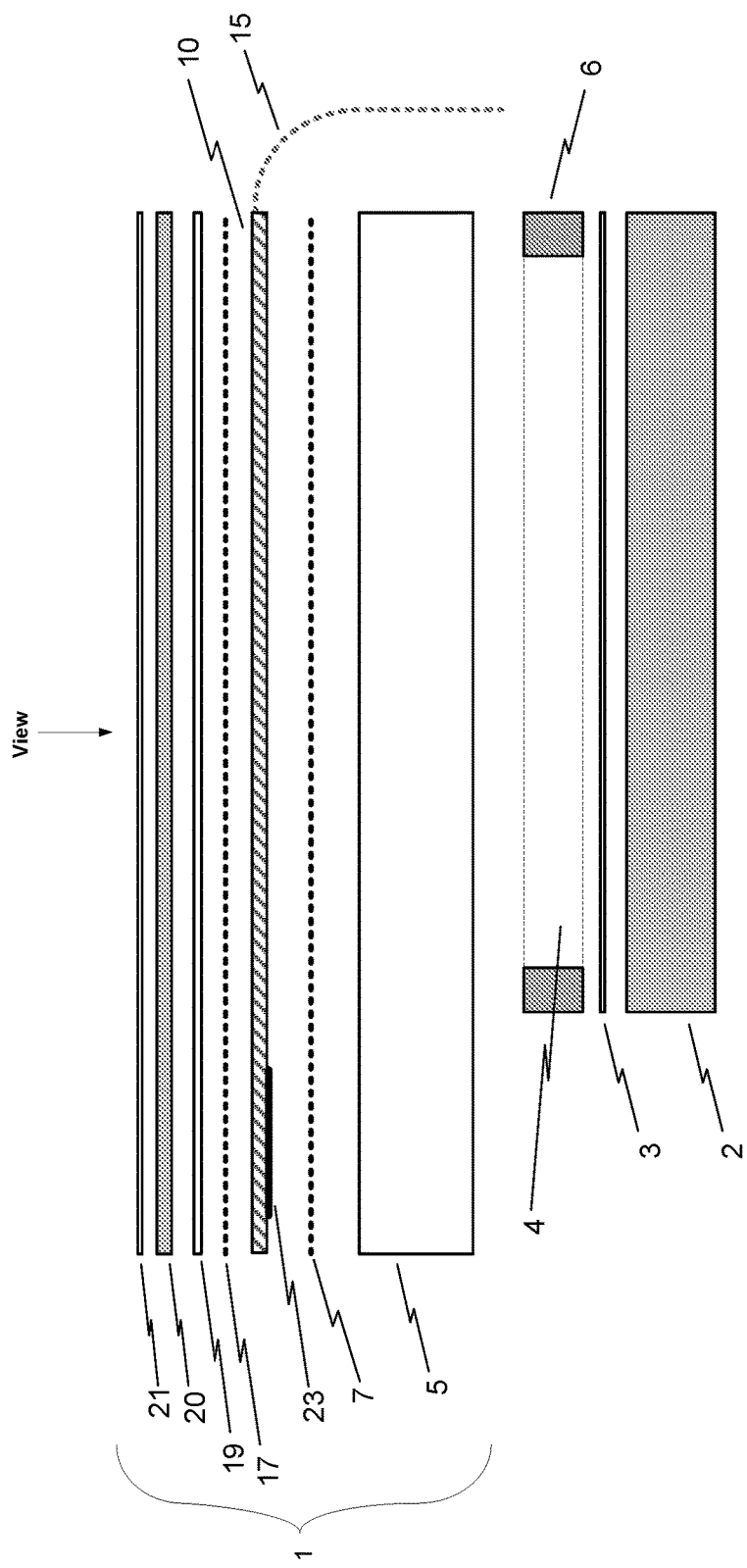
FIG. 13 illustrates an embodiment of the touch screen assembly of FIG. 1, except that a window/spacer has been obviated by a larger touch sensor.

In other situations, however, it may be desirable that the surface of the touch sensor extend beyond that of the display device 2 beneath it in one or more directions. For example, the touch sensor 10 in FIG. 1 could extend laterally to eliminate the need for spacer 16. This is depicted in FIG. 13, which is the same as the touch screen assembly depicted in FIG. 1, except that the spacer has been obviated by the larger touch sensor 10. The larger surface of the touch sensor eliminates the "edge effects" for touches in the area on the touch sensor directly above the corresponding edge on the display device. This improves the performance of the sensor in detecting touches by the user to images projected at the edge of the display 2. In addition, the portion of the sensor 10 that extends laterally beyond the presentation area of the display device 2 need not be useless. Images may be presented on the touch sensor in the "over-hang" area by means not involving the display screen 2. For example, touching a painted image of an icon 23 for a telephone on the over-hang portion of the touch sensor 10 in FIG. 13 could activate the placing of a phone call. This could be useful for presenting icons for standard features, e.g., activation of a main menu, that should always be available to a user regardless of what is being displayed by the display device 2.

Figure 4:
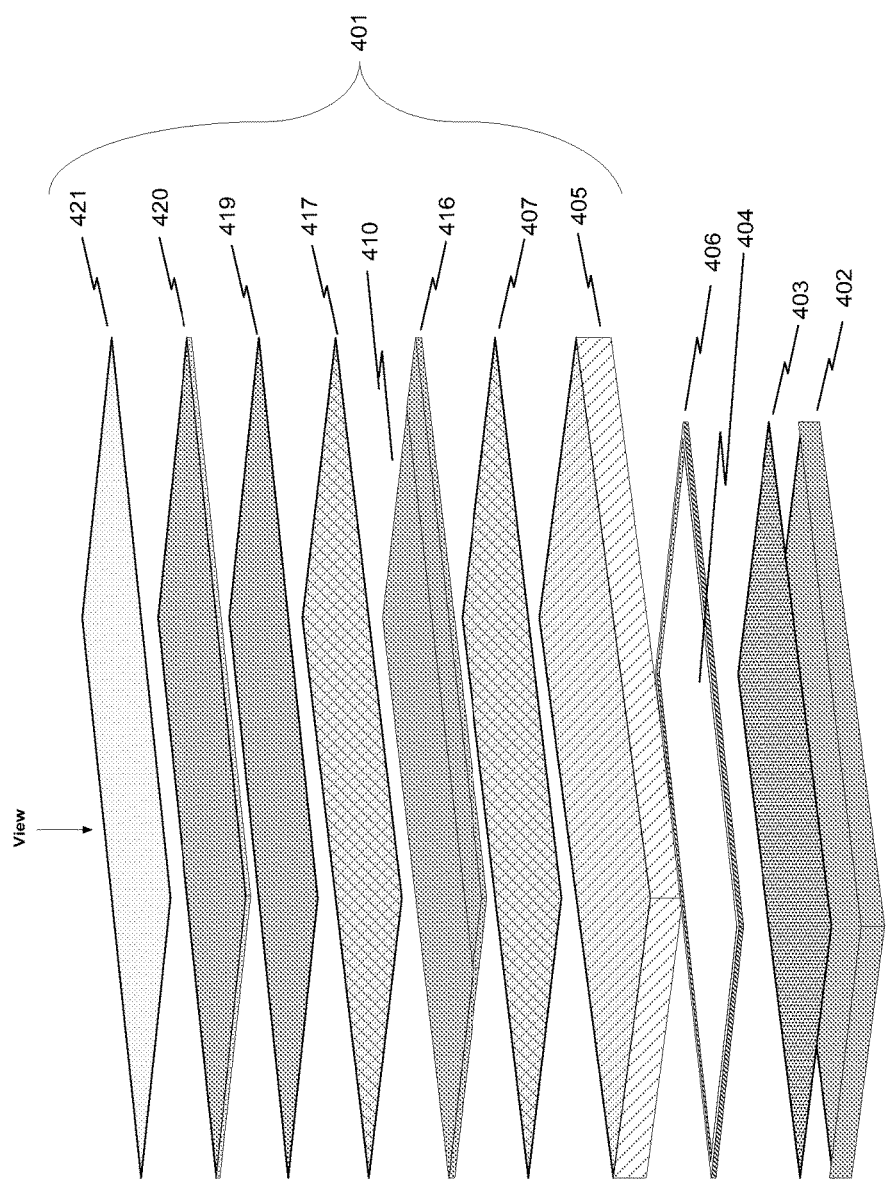
FIG. 4 is an isometric, exploded view of components of one embodiment of a touch screen assembly in accordance with the present invention.
Figure 6:
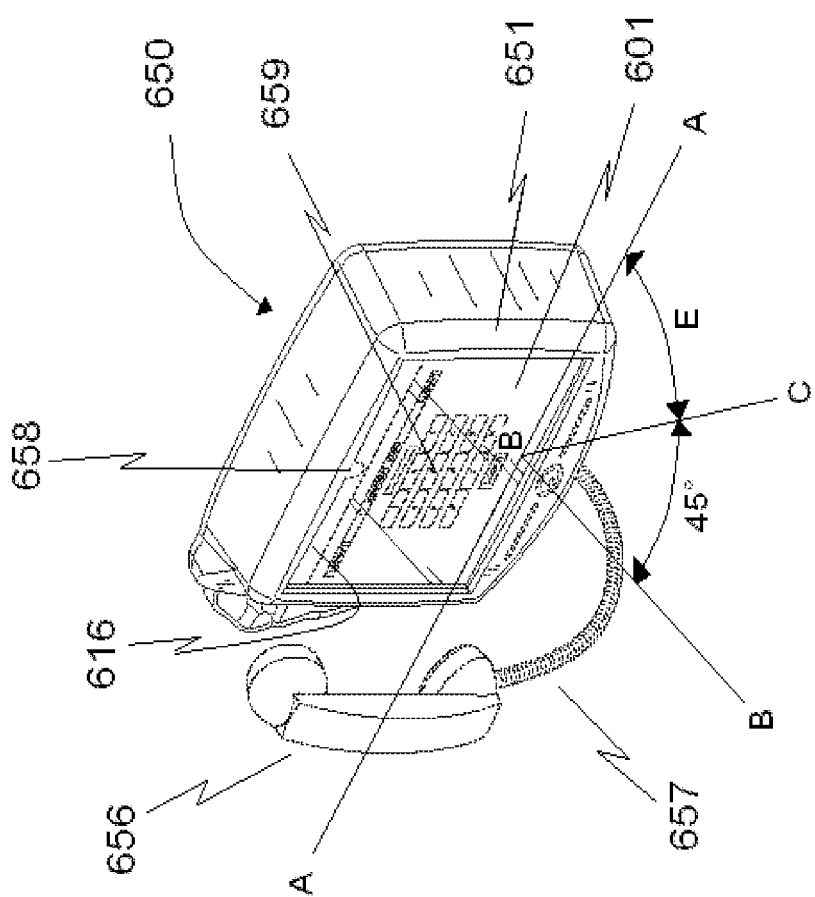
FIG. 6 is a perspective view of the assembled device containing the components depicted in FIG. 5 and schematically illustrating the inherent privacy feature in embodiments of the invention.

As shown by 16 in FIG. 1, 416 in FIG. 4, 516 in FIGS. 5 and 616 in FIG. 6, the window/spacer may be deployed along one edge or border of the touch screen as it is seen visually by the user. However, the various components of the touch screen assembly could be positioned in other arrangements, such that a window/spacer is used and appears along two, three, or all four edges of the touch screen. Depending on that arrangement, as it would appear to the user, the active touch screen surface 10 would be surrounded by a margin or "frame" on one or more, if not all, sides.

As depicted in FIG. 1, there appears to be a gap or space between the lateral edges of window/spacer 16 and touch sensor assembly 10. This is for ease in illustrating that these two items are separate components. However, in some embodiments of it is desirable for window/spacer 16 and touch sensor assembly 10 to butt against one another as closely and evenly as possible within available manufacturing tolerances. This may be useful for purposes of facilitating lamination with the layers immediately above and below these components in the touch screen assembly. As depicted, for example in FIG. 4, the touch sensor assembly (item 410 in FIG. 4) and the window/spacer (item 416 in FIG. 4) may be considered as a single layer. In some embodiments, these components are not affixed to one another, although it is possible that they could be. Similarly, it is also preferable in some embodiments that the window/spacer 16 is identical or substantially identical in thickness to the thickness of the touch sensor assembly 10. As discussed later, a disparity in the thicknesses of these components can impair manufacturing, lead to air entrapment and to product rejects. A disparity in the heights, i.e., thicknesses, of these components may also impair operation of the touch sensor.

It is desirable to use an adhesive 7 and 17 on the bottom and top (respectively) of the spacer to bond it to the substrate 5 below and the protective layer 20 above (via intervening black-out mask 19).

In one embodiment illustrated and described, for example, in FIG. 5, unit 501 including the touch screen assembly has a gasket-like mounting system around the edges—both front and back, i.e., gaskets 525 and 526, respectively. This provides an additional "shock absorber" effect.

Finally, as shown generally, in FIG. 1 an electrical cable or "pigtail" 15 is attached to the touch sensor to provide electrical information from the touch sensor to a computer processor or controller (not depicted) to determine the location of the "touch" on the front cover 20. Although a pigtail is shown, any other suitable method for providing electrical information to and from the touch sensor may be used.

Figure 2:
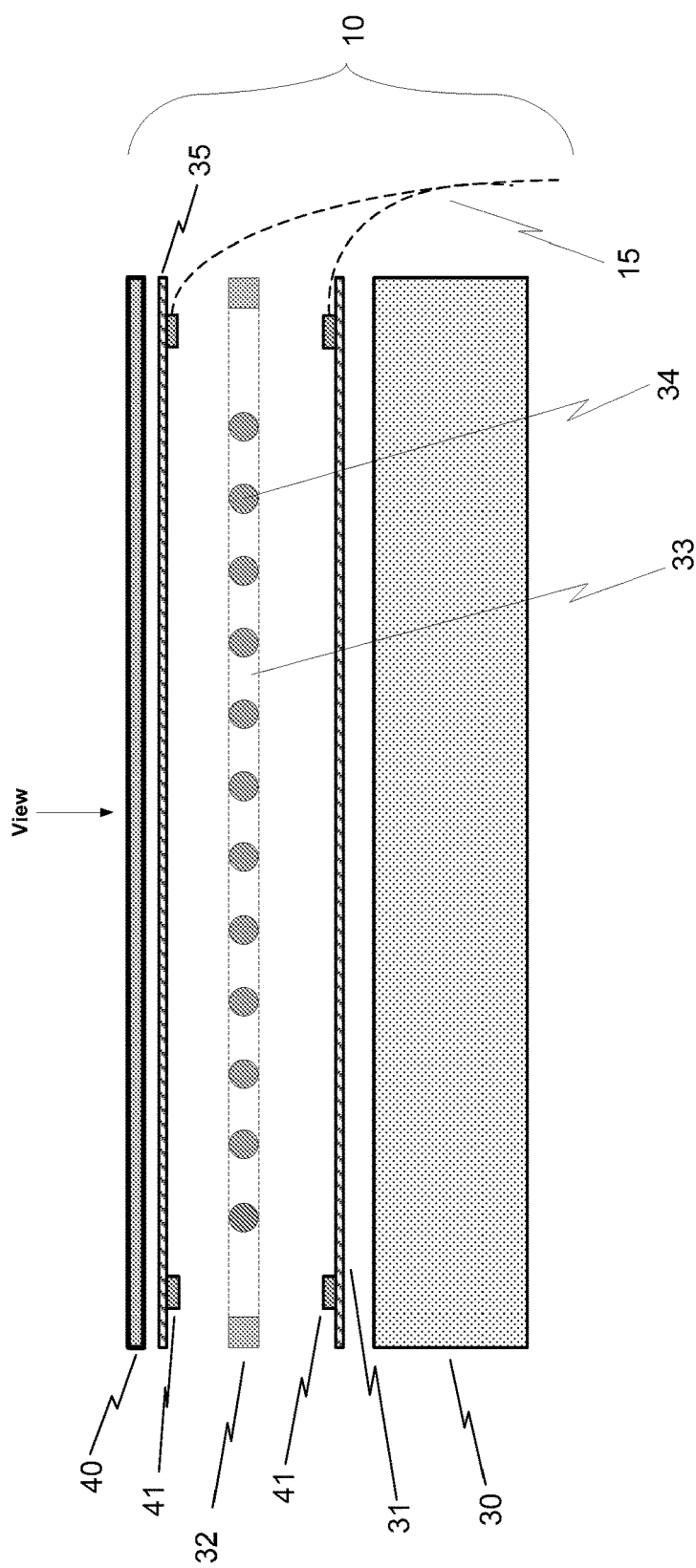
FIG. 2 is a side view of one construction for a touch sensor suitable for use in touch screen assemblies with the components of the sensor generally being depicted in an "exploded" view prior to assembly.

FIG. 2 depicts one embodiment of a touch sensor 10 subassembly in accordance an embodiment of the invention. FIG. 2 illustrates the basic, i.e., operative, components of a touch sensor subassembly utilizing resistive sensor technology. Other forms of touch sensor technology can be employed provided that the sensor is at least somewhat flexible, is physically compatible with optically clear attachment to adjacent materials, and can detect a touch and the location of the touch through a thick protective layer such as described in connection with FIG. 1. Resistive touch sensor technology provides these attributes and may be preferred, particularly for applications where low power is available or low power consumption is desired. Embodiments may use touch sensor technology that is capable of detecting multiple, simultaneous touches by the user.

FIG. 2 is an "exploded" view that depicts the various components of the resistive touch sensor subassembly 10 in the order in which they are arranged to one another, but does not show the components in the position in which they are finally assembled. (See FIG. 3.)

The bottom layer 30 in FIG. 2 is typically a very thin flexible glass sheet. Unfortunately, the depiction in FIG. 2 (which is not drawn to scale) might suggest that this is a thick material. But, in fact, sheet 30 is thinner than in a typical touch sensor. This thinness enhances the ability to efficiently laminate the various components of the subassembly 10 during the manufacturing process and aids in providing a relatively flexible subassembly product. Normally, the bottom layer 30 in a resistive touch sensor would be approximately 1.1 to 2 mm thick. Suitable thicknesses for the glass layer of embodiments herein may range from about 0.4 mm to about 0.7 mm. One suitable glass is "CEC500S," available from "PGO" (i.e., Präzisions Glas & Optik GmbH), Iserlohn, Germany, in a thickness of about 0.7 mm, i.e., about 0.028 inch. Newer and even thinner forms of glass may further enhance the qualities of the layer 30. (See for example, "Willow™ Glass," available from Corning, Inc., Corning, N.Y.) The glass layer 30 serves the purpose of supporting the remainder of the touch sensor subassembly, providing one of the two surfaces which are employed in executing the resistive touch sensor technology, and providing flexibility to absorb shocks or blows to the front cover of the touch screen as described in connection with FIG. 3. An option for the substrate material for the resistive touch sensor would be to utilize an "ITO" (indium-titanium-oxide) coated polymer sheet with suitable physical and optical characteristics in place of the described thin glass substrate. One such suitable material is ITO-coated PET (polyethylene terephthalate) film about 0.001 to about 0.015 inch thick and preferably from about 0.001 inch to about 0.007 inch thick, available from Sigma-Aldrich, St. Louis, Mo.

Above the flexible glass sheet is the other surface or "film" 40 that participates in defining the resistive touch sensor. In one embodiment of the present invention, this surface 40 is a sheet layer of flexible plastic. Suitable materials include ITO PET in thicknesses ranging from about 0.001 inch to about 0.015 inch. In one suitable embodiment, the layer 40 is ITO PET in a thickness of about 0.007 inch. The layer 40 serves the purpose of providing the touch sensitive surface, i.e., the other of the two surfaces which are employed in executing the resistive touch sensor technology, and providing flexibility to absorb shocks or blows to the front cover of the touch screen as described in connection with FIG. 3.

Both the upper surface of the thin glass layer 30 and underside of film or plastic sheet layer 40 are coated with a combination of uniform sheet resistance "ITO" (indium-titanium-oxide) particles along with an associated highly conductive printed wiring arrangement (e.g., traces and connectors) to provide a set of interface contacts 41 to permit "reading" the ITO sensor's physical state. In FIG. 2 item 31 references the layer of ITO particles on the upper surface of glass layer 30, and item 35 references the layer of ITO particles on the underside of plastic sheet layer 40. A more detailed representation and explanation of the contacts indicated generally as "41" in FIG. 2 is provided in connection with FIGS. 7A and 7B.

Glass layer 30 and plastic sheet layer 40 are separated in two ways. First there is a very thin frame-spacer 32 that separates layers 30 and 40 and forms a space 33 in between them. Secondly, the space 33 between glass layer 30 and plastic sheet layer 40 contains a uniform arrangement of very tiny deformable, spacer "spheres" 34. These spacer spheres are depicted schematically in FIG. 2 to indicate their presence. Although the word "spheres" is used, it should be understood that any 3-dimensional shape may be employed in the sensor to perform the spacing function and perfect spheres are not necessary. Typically, these spheres 34 are formed of silicone and are only about 50 to 100 millionths of a meter in diameter. The spheres are generally fixed in place by momentary heating during manufacture of the touch sensor assembly. The function of these "spheres" in the operation of the touch sensor is described with respect to the fully assembled touch sensor assembly shown in FIG. 3. Generally, both the frame-spacer 32 and the spheres 34 act as "insulators" maintaining a space 33 between the ITO layers, as described below.

Finally, touch sensor 10 includes a "pigtail" 15 that is electrically and mechanically bonded to the "glass" and "thin plastic sheet" printed conductors to permit external electrical connectivity to the functional sensing elements (printed wiring and ITO material as known to one skilled in the art). The connection point is designated as item "41" in FIGS. 2 and 3, but the detail is depicted in and described with respect to FIGS. 7A and 7B.

Figure 3:
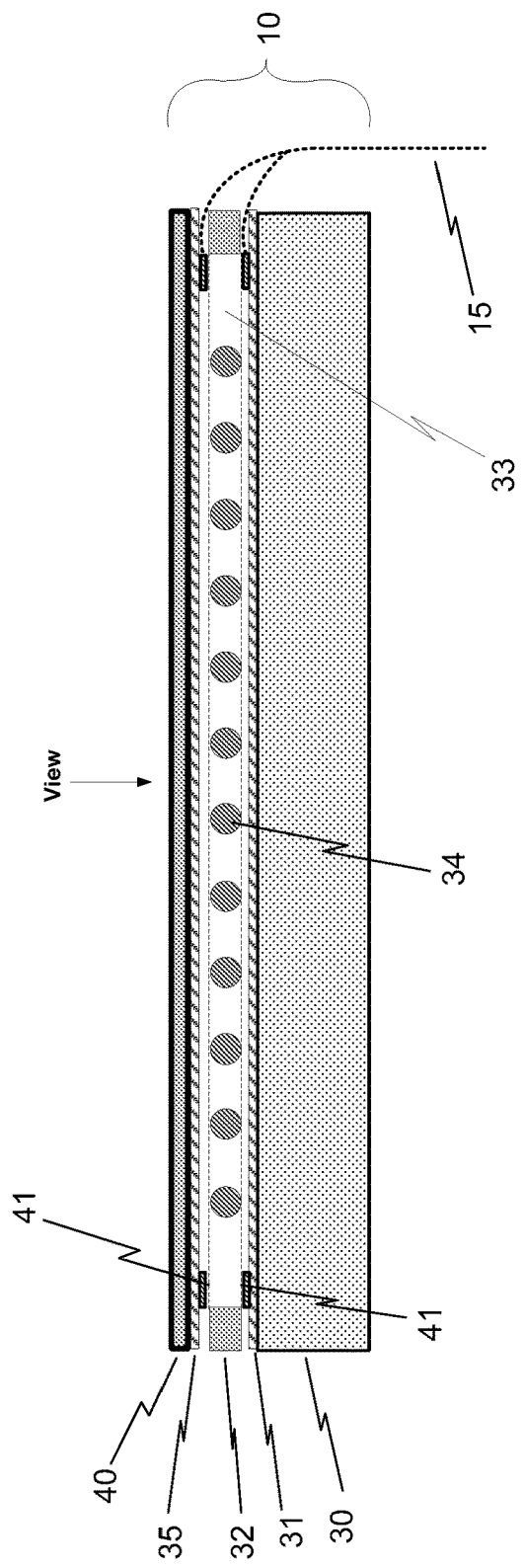
FIG. 3 is a side view of the touch sensor components of FIG. 2 with the components generally being shown in an assembled arrangement.

FIG. 3 schematically depicts the same touch sensor subassembly 10 as in FIG. 2, but with the components assembled together as a unit, except as noted below. Accordingly the same reference numbers have been used in FIGS. 2 and 3. The subassembly includes thin, flexible glass sheet 30 and upper, flexible plastic layer 40. The opposing faces of these surfaces are coated with uniform sheets resistance "ITO" 31 and 35 and a highly conductive printed wiring arrangement to provide a set of interface contacts to permit "reading" the ITO sensor physical state. (See FIGS. 7A and 7B.)

The upper and lower layers 40 and 30 are separated by the spacers 32 and the deformable spheres 34. Preferably the diameter of the spheres is about the same as the height, i.e., thickness, of the spacers. The spheres maintain a uniform separation between the layers 30 and 40 across their respective surface areas under normal conditions. However, when the front cover (i.e., the protective layer) 20 is touched, layers 40 and 30 and their respective facing ITO layers 35 and 31 are forced together causing a small area of mutual physical contact suitable to conduct a very small electrical current to the resistive touch sensor reading or controller electronics or other appropriate mechanism. [Please note that in the fully assembled condition, the bottom layer 30 and its ITO surface 31 and the upper film 40 and its ITO surface 35 would contact and rest upon the upper and lower faces of spacers 32 at the respective edges of their surfaces. As illustrated in FIG. 3, these surfaces are depicted as being separated vertically from the spacers 32 in order to illustrate the connection of "pigtail" 15 to contacts 41.]

As can be appreciated, the sensitivity of the touch sensor 10 is determined, among other things, by the distance of separation between the upper and lower layers 40 and 30, the number and spacing of the spheres 34, the softness/hardness of the spheres, the conductivity of the various components on the facing surfaces of layers 35 and 31, and other factors. However, the resolution of a touch screen using resistive technology is more closely dependent on the controller and the number of bits used in reading positions on the touch screen. These considerations would be known to one of ordinary skill in the art. Of significance here is the fact that even though there is a thick polycarbonate layer on the front of such touch screens, it is still possible to get very good resolution (better than 0.25 inch square) and accuracy.

Not only can a touch be detected through the thick, protective front cover 20, but the touch sensor assembly 10 also provides significant contributions to other desirable qualities of the touch screen assembly 1. Because glass layer 30 and film layer 40 are thin and at least somewhat flexible, the lamination process can be accomplished effectively, e.g., there are fewer defects resulting from the formation of "bubbles" between laminate layers. This reduces the cost of manufacture and produces a better quality product.

The flexibility of these structural components of the touch sensor 10 also reduces the likelihood that a significant blow or force to the front cover 20 will damage the touch sensor. In contrast, previous sensors with stiff or brittle components will be damaged more readily. The most likely response of prior art sensors to a significant blow is to crack or break—rather than to bend like the touch sensor assembly described herein. Further, the flexible touch sensor assembly 10 and the support layer 5 beneath it (see FIG. 1) both "give" with a significant blow to the front cover 20. This bending is facilitated in embodiments where an air space is present between the support layer 5 and the electronic display 2. Cushioning may also be provided by the various gaskets depicted in and described with respect to FIG. 5. Thus, the front cover 20 will resist external blows, and features of the entire touch screen assembly 1 will enable it to act like a shock absorber to cushion any significant blows thereby avoiding or minimizing damage to the components of the touch screen assembly and anything that lies beneath it.

FIG. 4 is an isometric view of components of one embodiment of a touch screen assembly 401 and display 402. The components in this particular arrangement are described in more detail in other portions of this description, but FIG. 4 provides a different perspective of their arrangement. Generally, FIG. 4 provides an isometric view of a touch screen assembly 401 like the assembly depicted in FIG. 1. In order, from the lower-most component to the top, FIG. 4 shows display device 402. As depicted in FIG. 4, an optional privacy screen or filter 403 is affixed to display 402 or otherwise located in front of the display screen 402.

Also located above the display screen is substrate or backing 405 to support the touch sensor assembly 410 as previously described. Between the display screen and the substrate is shadow box gasket 406 as will be depicted again and described in connection with FIG. 5. Shadow box gasket 406 serves to create a space 404 inside the gasket 406 and between the substrate 405 of the touch screen assembly 401 and the display screen 402 with its privacy filter 403. Layer 407 comprises an optically clear adhesive which attaches the front of the substrate 405 with the back of the touch sensor 410 and window/spacer 416. The front of the touch sensor assembly 410 and window/spacer 416 are covered by another layer 417 of optically clear adhesive. That adhesive layer bonds the touch sensor and spacer window to the back of the protective layer 420, which is coated with black-out mask 419. The front of the protective layer is coated with one or more masks or coatings represented at 421 for the purposes mentioned previously.

FIG. 5 depicts an example of a device employing an embodiment of the present invention. FIG. 6 is an isometric view showing one arrangement of the components of a touch screen assembly inside the housing of an integrated services access module 550 described in more detail with reference to FIG. 6. The module consists of front housing or portion 551 and rear housing or portion 552. The rear portion 552 of the module can be telescopically inserted into and fixed inside the front portion 551 when the module 550 is fully assembled as in FIG. 6.

As depicted in FIG. 5, the device includes an electronic display 502, in this instance an LCD, for projecting images to the user. Attached in front of the display is an optional privacy filter 503 which limits the visibility peripherally of images presented by the display 502. And in front of the display is a unit 518 including touch screen assembly 501, which is the same size dimensionally as the area for displaying images projected by 502. It may be advantageous to slightly oversize the active area of the resistive touch 501 sensor subassembly to maintain uniform touch detection sensitivity around the periphery of the perceived image from the display device 502. Adjacent to the touch sensor 501 at the top and coplanar with the touch sensor is black-out spacer 516. The black-out spacer has a cut-out or window area 557. A camera may be mounted behind the window in the location illustrated in FIG. 12. The lens of the camera 657 as it would appear to a viewer is illustrated best in FIG. 6. As illustrated in the embodiment shown in FIG. 5, the touch sensor assembly 501, the black-out spacer 516, and the window cut-out 557 in the spacer are all provided in a single co-planar unit 518 for arrangement inside the housing of the integrated services access module 550.

When assembled, the display 502 is retained at its sides by supports or channels 554 located inside the left and right sides of rear housing 552. One such channel 554 is depicted in the left side of housing 552 in FIG. 5, with the other support being similarly located in the right inside of rear housing 552, but obscured by the outside of housing 552. The outside of bolts, screws or other mounting devices 555 for attaching the right channel to the housing are depicted on the outside of housing 552 in FIG. 5. Thus FIG. 5 illustrates a channel and the attachment for a channel from both the inside and outside of housing 552.

On the front of the display 502 is the optional privacy screen 503. Such screens are commonly known to one of ordinary skill in the art and serve the purpose of limiting the view of the display screen as much as possible to someone directly facing the screen. Typically they provide privacy at angles of 6°, 11° or 12°. One suitable privacy filter material is "ALCF-PABR2," available from the 3M Company, St. Paul, Minn.

Also, in front of the display and extending around its periphery is a shadow box gasket 506 of firm, but pliant foam or other suitable material. An example of a suitable gasket is Poron® manufactured by Rogers Corp, Rogers, Conn. and approximately 0.03 to 0.125 inch thick prior to installation. As depicted in FIG. 5, the front of the shadow box gasket 506 rests against the back of unit 518 and surrounds the active portion of the touch screen assembly 501. As illustrated and described in connection with FIG. 4, when the components are fully assembled, the shadow box gasket 506 serves to create a space 504 inside the periphery of the gasket and between the touch screen assembly 501 and the display screen 502 and its associated privacy filter 503. The shadow box gasket also serves as a dust protector to prohibit or impede "dust" from entering space 504 and reducing the effectiveness of the electronic display 502. Although compressed somewhat in the fully assembled unit 550, the gasket provides some ability to compress further and to absorb shock. Most importantly, the gasket holds the touch sensor 501 in place when the integrated services access module 550 is fully assembled and avoids stresses on the sensor that could result from other possible mounting means that would cause cracking of the sensor surface over a period of time.

Between the back of the unit 518 and the rear housing 552 is a rear housing gasket 526. This is the same size as the periphery of the back of the unit 518, but is larger than the electronic display 502 and the shadow box gasket 506. Rear housing gasket 526 rests on a support ledge 556 extending around the front inside of rear housing 552 and supports the full periphery of the back of unit 518 when those components are assembled. Similarly, at the front of unit 518 is a front housing gasket 525. This gasket rests in similar support channels or grooves located at 553 inside the front housing. Other means of mounting the various components inside the front portion 551 and rear portion 552 of the housing can be employed. In one embodiment, the channels or grooves 556 in the rear housing 552 and the channels or grooves 553 in the front housing 551 are slightly smaller than the width of the rear housing gasket 526 and the front housing gasket 525, respectively, so that the gaskets do not shift location after they are installed.

The gaskets 525 and 526 are made of a firm but compressible material that further assists in absorbing a force or blow to the housing 551, the front portion of unit 518 or even the rear portion of the housing 552, e.g., in a situation where the device is dropped or otherwise confronted with a force or blow during installation, removal, or shipping, etc. An example of a suitable gasket is Poron® manufactured by Rogers Corporation, Rogers, Conn. and approximately 0.03 to about 0.063 inch thick prior to installation.

FIG. 6 depicts one application of a touch screen assembly of the present invention. FIG. 6 is an exterior view of the device depicted in FIG. 5 as assembled, with the exception that the electronic display 502 does not include privacy screen or filter 503. In addition to the touch screen components shown in FIG. 5, the device may also contain other items, such as hardware and software for supplying or receiving the requisite electrical power, controllers, memory and means for sending and receiving necessary electronic signals.

FIG. 6 provides a perspective view of a particular embodiment of an electronic device 650 suitable for use in an institutional environment, such as a prison, to allow the institution to efficiently deliver a variety of services useful to detainee/users. Typically, the "integrated services access module" ("ISAM™," a trademark of Cottonwood Creek Technologies, Inc., Centennial, Colo. and the assignee of the present invention) 650 is mounted on the wall (not shown) of a "day room," in a prison "cell," or in another area for access by a larger or smaller number of prisoners. The integrated services access module includes a front housing 651, a touch screen assembly 601 for displaying content and for receiving input from the user, an outwardly-facing camera 658 visible through window 557, and a telephone handset 656 and associated cord 657.

Frequently, the integrated services access module 650 is a replacement for a wall mounted telephone previously employed to permit authorized prisoners using their carefully controlled telephone privileges to make outside phone calls to authorized recipients. Like these standard, simple telephones, the integrated services access module 650 also supplies telephone capability either in the form of "plain old telephone service" (i.e., "POTS") or by other means such as voice-over-internet ("VOIP"). However, the integrated services access module 650 is a significant "upgrade" in that it provides a number of other services, such as: the ability to make phone calls including one-way or two-way pictures or video; the ability to provide remote visitation access with family, friends, lawyers or other persons located on other portions of the prison facility or elsewhere; the ability to access account statements and to perform transactions with the prison commissary and/or with the prisoner's financial account; the ability to access portions of the internet or an institutional intranet; etc. In addition, the camera can be used for a retinal scan or other means, such as a photograph, to authenticate that the user is the prisoner who he/she claims to be. Other devices associated with the integrated services access module, such as the additional features and devices identified and described in U.S. Pat. No. 8,594,314 can also be used to identify or verify the identity of a person attempting to use the integrated services access module 650 or to access or provide other services. U.S. Pat. No. 8,594,314 has the same inventors and assignee as the present application and is incorporated by reference herein.

Conventional telephones frequently employed in prisons are powered by relatively standard voltage and current supplied by POTS over a two-wire cable (e.g., a twisted wire pair) ultimately connected to the public telephone system. Although the integrated services access module is multifaceted and requires more electrical power than is delivered by standard POTS voltage and current, it is possible to provide sufficient enabling power to the module over the same two-wire cable system using the enhanced power and signaling methods and apparatus described in U.S. Pat. No. 8,594,314. Nevertheless, it is desirable to reduce the power required to operate the various features of an integrated services access module. Touch screen assemblies using resistive sensor technology help minimize the power requirements.

FIG. 6 shows a perspective view of an integrated services access module 650. The touch screen display 601 depicted in the drawing illustrates a telephone keypad 659 for use in dialing a telephone number or otherwise entering numerical information for other applications. The screen is also used to display various menus, sub-menus, pages and associated keyboards, buttons and/or hotspots in the course of selecting and providing services, such as those noted above. With respect to the illustration in FIG. 6, an authorized user will touch the "keys" displayed on the screen to enter a telephone number. In many instances, information inserted by the prisoner/user into the touch screen or displayed on the screen is "private" in the sense that the prisoner may not want another person standing in front of the integrated services module to see and understand what is on the screen or is being entered by the user via the screen. As noted previously, an inherent and unexpected advantage of embodiments described herein is that it limits access to that information.

As depicted in FIG. 6, the outer surface of the touch screen assembly 601 is in a vertical plane along the line A-A. The user is ordinarily in position in front of the screen along line B-B generally perpendicular to A-A. According to embodiments of the invention, the screen is visible peripherally to a position at an angle of about 45° from B-B, i.e., along line C-B. The important point is that the image depicted on the screen is not viewable by a person standing peripherally beyond point C, i.e., within angle E. The foregoing illustrates the inherent privacy of touch screen assemblies of these embodiments even absent a privacy filter over the electronic display. This results primarily from the index of refraction of the substrate polycarbonate along with the spacing thickness. While a privacy filter can be employed, touch screen assemblies in embodiments describe herein provide an alternative way of inherently delivering this privacy feature without the additional expense of the filter.

Figure 7A:
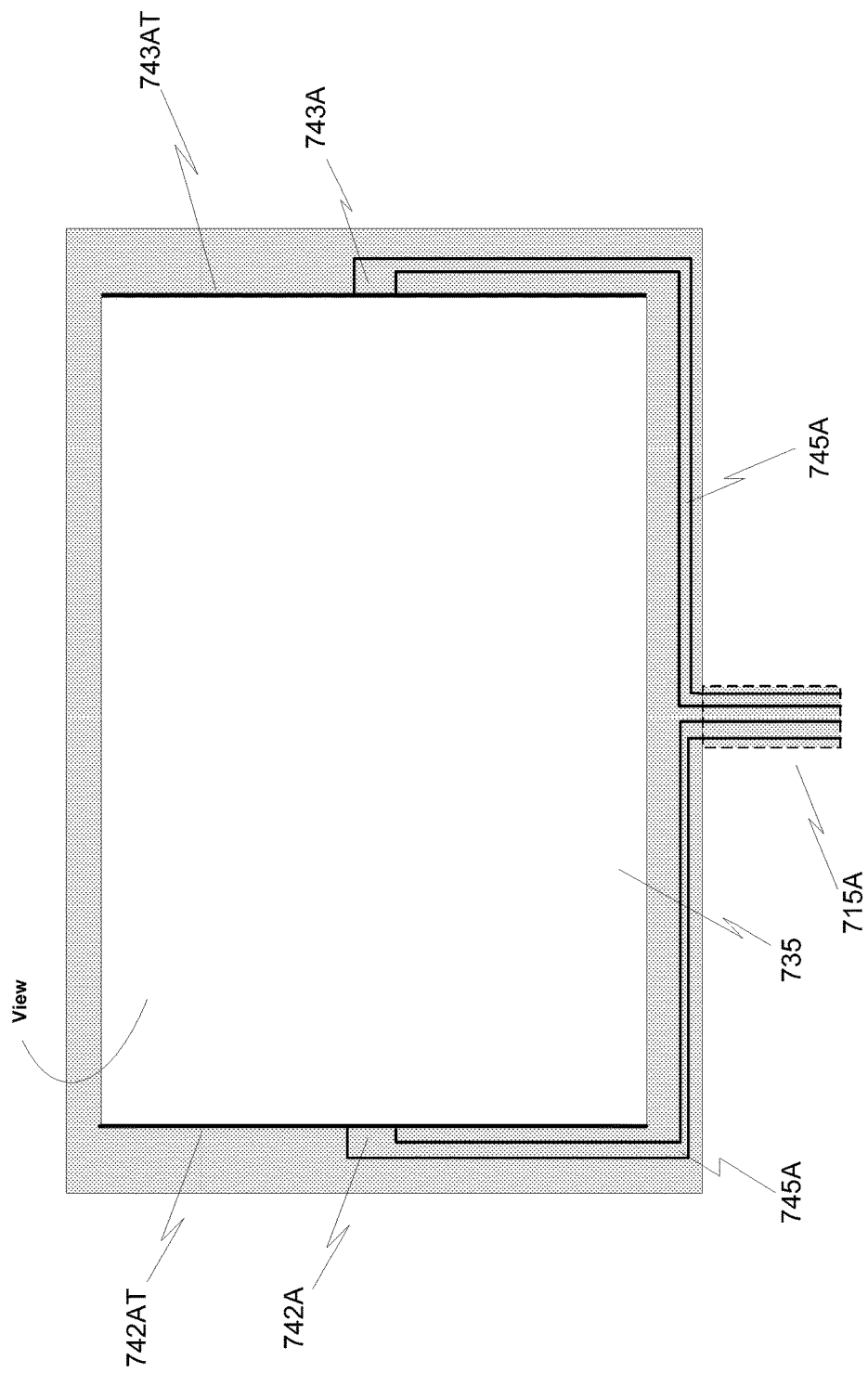

FIGS. 7A and 7b show the location of the electronic contacts in the active layers of a resistive touch sensor in one embodiment of the present invention. FIG. 7A is a top view showing one arrangement of the contacts associated with the ITO layer 735 associated beneath the upper film layer 40 (FIG. 2) of such a touch screen sensor assembly 10 (FIG. 2). FIG. 7B is a top view showing one arrangement of the contacts associated with the ITO layer 731 associated above the very thin sheet of glass or plastic 30 (FIG. 2) on the lower portion of such a touch screen sensor assembly 10 (FIG. 2).

As previously mentioned, the resistive material used in resistive touch sensors is generally constructed with indium-titanium-oxide ("ITO"). This material is deposited on two panels that are positioned in a parallel configuration in close proximity to each other (FIG. 3), e.g., thousandths of an inch apart, with the ITO surfaces facing each other across the small gap. When a user touches one of the substrate panels, the force applied in the touched area temporarily deforms the substrate enough that it creates a contact point to the opposite substrate panel. Since the ITO material is present in all areas of the touch sensor, the contact point created above creates a connection between the top substrate and the bottom substrate ITO layers.

During normal operation, the substrates are alternately energized with a unidirectional voltage causing a portion of the unidirectional voltage to be conducted to the opposite substrate through the contact point described above, and the resultant voltage measurement is calculated to derive the X and Y coordinates of the 'touched' contact point. An intelligent controller is required to provide the logic and signals for this process.

For example, the bottom substrate 731 (FIG. 7B), would be in an energized mode producing a unidirectional voltage gradient across the ITO layer to provide a known measurable source and the top substrate 735 (FIG. 7A) would be in a voltage detection mode that is capable of measuring the voltage at the point of contact between the substrates. The measured voltage is the result of the voltage divider created by the 'touched' contact point across the source substrate. This measured voltage can be calculated to provide the Y-axis of the 'touched' contact point. When the Y-axis location is calculated, the intelligent controller quickly reverses the modes of the substrates to calculate the X-axis location. In this mode, the top substrate 735 (FIG. 7A) would be providing the unidirectional source voltage gradient to the contact point and the bottom substrate 731 (FIG. 7B) would in the voltage detection mode to measure the voltage at the contact point through the ITO material. This measurement can then be used to calculate the X-axis. Now the exact X and Y positions of the user's touch (contact point) are known and can be utilized by the requesting system.

FIGS. 7A and 7B represent typical top and bottom 8-wire resistive touch sensor substrates that show the contact points that connect the ITO layers to the outside world and the intelligent controller. Resistive touch sensors are currently available in 4, 5, and 8-wire configurations; however, the 8-wire configurations are the most desirable because they can provide a more accurate, more linear, and more stable operation than the 4-wire or 5-wire configurations. As shown in FIGS. 7A and 7B, the 8-wire configuration has a pair of connections to each active ITO plane of the substrates to achieve the desired linearity. In FIG. 7A, item 742A depicts the two contact points that interface to the traces (i.e., conductive tracks) 742AT on the left perimeter of the ITO material 735 and the item 743A depicts the two contact points that interface to the traces 743AT on the right perimeter of the ITO material. One skilled in the art would understand that typically the contacts and traces would be one continuous piece. These contact points, when measured with an ohmmeter, would show the resistive continuity through the substrate contacts and ITO material.

In FIG. 7B, Item 742B depicts the two contact points that interface to the traces 742BT on the top perimeter of the ITO material 731 and Item 743B depicts the two contact points that interface to the traces 743BT on the bottom perimeter of the ITO material. Again, one skilled in the art would understand that typically the contacts and traces would be one continuous piece. As in FIG. 7A, these contact points, when measured with an ohmmeter, would show the resistive continuity through the substrate and ITO material. The ITO material is shown in FIGS. 7A and 7B as items 735 and 731, respectively. The traces 745A and 745B effectively surround the combined active ITO layer on the respective surfaces and connect the combined ITO layer to the outside world via the contacts at the end of 715. In the embodiment shown in FIGS. 7A and 7B, the active area of the ITO layer corresponds with the viewable area on the touch sensor display beneath.

In operation, the ITO contact points 742AT/743AT and 742BT/743BT on both surfaces will be connected to the outside world to the intelligent controller which will provide the appropriate source and measurement functions to the ITO material. Connection from the contact points 742A/743A or 742B/743B to the outside world is typically accomplished through a flexible cable assembly to reduce stress on the substrate materials. As illustrated in FIGS. 7A and 7B, the connection may be made via a flexible electrical connector attaching the contacts/traces associated with the upper ITO layer with a "pigtail" segment 715A on FIG. 7A and via a flexible electrical connector attaching the contacts/traces associated with the lower ITO layer with "pigtail" segment 715B on FIG. 7B. (See also FIGS. 2 & 3.) The intelligent controller can vary magnitude and polarities of the signals to the contact points as required for optimum performance so 742A/743A or 742B/743B on either surface can be either positive or negative polarities. An example of a suitable controller would be the AR1021-I/SO from Microchip Technology, Inc., Chandler, Ariz. Such a processor has internal capability of 10-bits of resolution, e.g., 1024 discrete values. If employed in an 8-bit mode, it is possible to get a horizontal resolution of slightly finer than 1 mm on a touch sensor surface with a horizontal dimension of 224 mm and vertical resolution slightly finer that 0.5 mm in a vertical dimension of 126 mm. The measurable or usable resolution is a function of the analog to digital bit conversion employed within the controller technology. Touch sensors of embodiments described herein can achieve a resolution better that 0.25 inch square.

FIGS. 7A and 7B illustrate one possible arrangement of components for monitoring and analyzing the condition of the ITO layers. Many other possible arrangements could be employed as would be appreciated by one of ordinary skill in the art of that technology.

Figure 12:
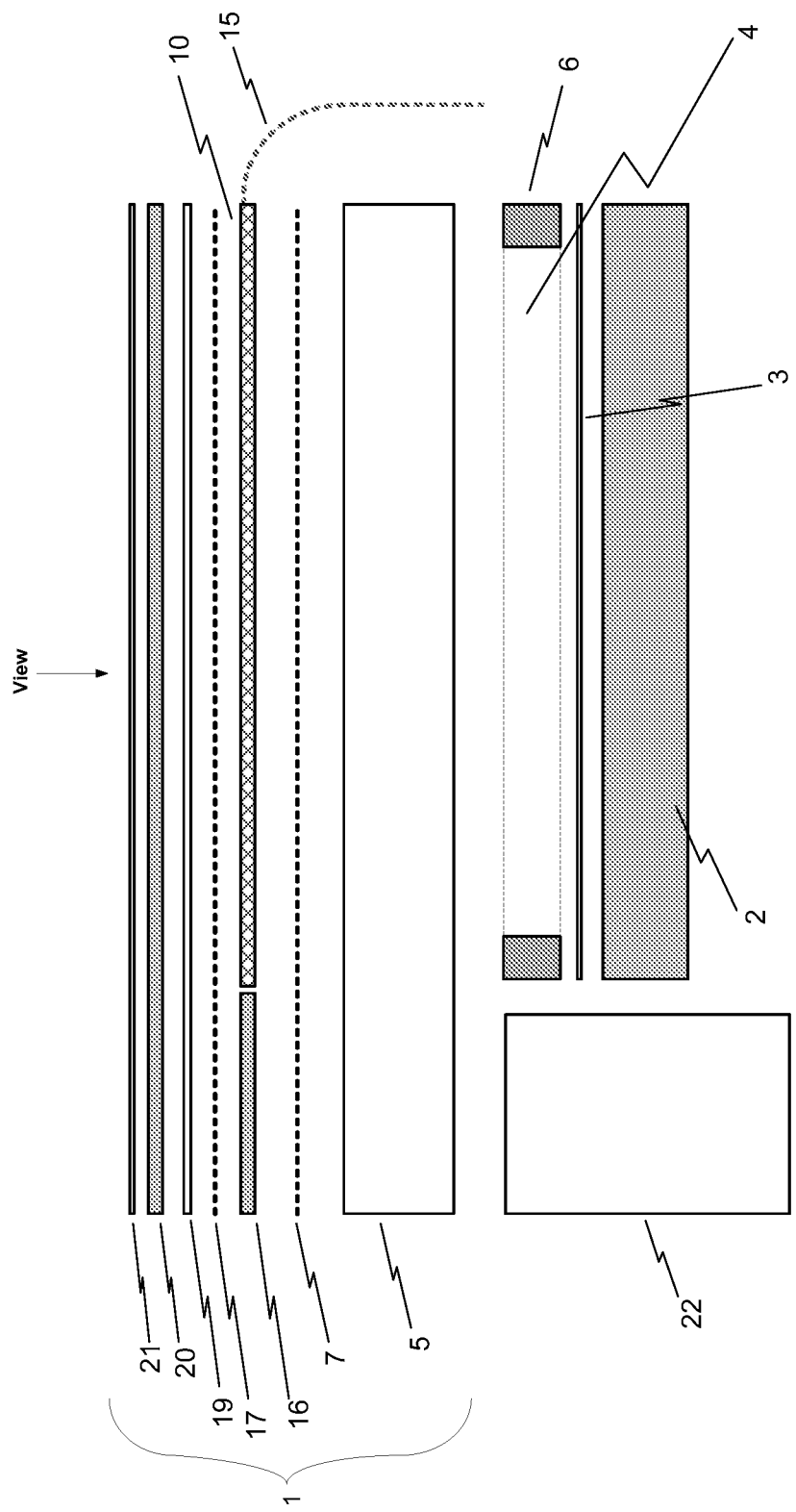
FIG. 12 shows one possible location for the positioning of additional electrical components, e.g., camera, lights and/or infrared sensors, in relation to the laminate layers of FIG. 1.

FIG. 12 shows one possible location 22 for the positioning of additional electrical components, e.g., a camera, subject lights, and/or light and/or infrared sensors, in relation to the laminate layers of FIG. 1. Area 22 is an appropriate location for placement of a camera that can be deployed to capture the face of a user in front of the screen or for otherwise taking still or moving images of the area in front of a touch screen device, such as that depicted in FIGS. 5 and 6. The area in the image and its focus can be governed by the orientation of the camera and the lens or lenses employed. In one embodiment, it may be useful to have multiple lenses available or a single variable focus lens, the selection of which can be determined either by the user of the device, a party with whom the user is communicating via the device and/or by another third party such as the staff of an institution responsible for monitoring users and their use of the device. The same location can be used for lights to illuminate the subject in front of the camera. [Note that this is different from backlighting which may be incorporated into the touch screen assembly as known to one skilled in the art and which may be particularly useful in providing adequate lighting of the screen and/or elements displayed on the screen under various ambient lighting conditions, especially dark or dim environments.] Finally, area 22 may also be an appropriate location to contain sensors, such as infrared or other light sensors, that may be useful for detecting the presence or movement of objects in front of the screen. Acting alone or as a supplement to the touch sensor capabilities described previously, such light sensors may be useful as a further means for detecting the selection of elements displayed on the screen either by the placement or movement of a stylus, hand, or finger. Space permitting, one or more of the cameras, lights, and/or sensors may be employed in area 22.

Manufacturing

A method of manufacturing the touch screen assembly will now be described. It should be understood that other methods of manufacturing embodiments of the touch screen described above are also possible and that the method described below is not the only method of manufacture. In the embodiment shown in FIG. 1, for example, this would include items associated with touch screen assembly 1. As noted previously, several of these components (such as those in the touch sensor subassembly 10) are considered flexible, in that they are not absolutely rigid and, therefore, will "give" to absorb a blow or force applied to the surface. Nevertheless, when viewed from the perspective of manufacturing, these items would normally be considered to be relatively inflexible. This is so because these components cannot be easily bent or rolled into a curved shape during the manufacturing process. These manufacturing problems are exacerbated by the fact that when finally assembled, these components must be sufficiently optically clear to be usable. Thus, any successful manufacturing process should be accomplished while also minimizing the introduction and/or trapping of unwanted air bubbles between the surfaces of the components thereby preventing or impeding the transmission of images through them. Unfortunately even one such air bubble, if it is sufficiently large, may impair the optical clarity of the touch screen assembly thereby rendering it useless for its intended purpose.

Current industry methods generally employed to join relatively inflexible solid surfaces, such as laminate components employed in touch screen assemblies, are of two basic types. The first includes the application of an optically clear adhesive layer in the form of a strip or sheet from a roll on to one surface, and the direct placement of a second flat surface on top of the first surface. Without refinement, this method is likely to introduce or trap unwanted air bubbles. The second employs liquid optical bonding in which the surfaces to be joined are manipulated to introduce a bonding liquid in such a manner that would preclude the trapping of unwanted air bubbles. Unfortunately, the liquid optical bonding ("LOB") method is very expensive, not only due to the high cost of the liquid optical bonding materials, but more significantly due to the complexity and cost of the "jigging" and related tooling. In some cases LOB requires assembly within an evacuated enclosure to prevent air entrapment (bubbles) in the finished product.

As noted above, the touch screen assembly depicted in FIG. 1 has several components that are relatively rigid and pose problems in manufacturing the laminate touch screen assembly. Stated differently—from the perspective of the adhesives used to bond these laminate components—there are four adhesive-to-solid surface interfaces which pose potential manufacturing difficulties. These interfaces occur at: (a) the junction between substrate 5 and adhesive 7; (b) the junction between adhesive 7 and touch sensor subassembly 10; (c) the junction between touch sensor subassembly 10 and adhesive 17; and (d) the junction between adhesive 17 and protective layer 20. As will be described below, FIGS. 8, 9, 10 and 11 illustrate one set of procedures for solving the manufacturing issues associated with these four interfaces. These solutions are intended to be exemplary and not exhaustive of manufacturing techniques employing embodiments of the present invention. For convenience, the same reference numbers have been used in connection with all four of these drawings to facilitate continuity in describing the operations of the four procedures depicted schematically therein.

Figure 8:
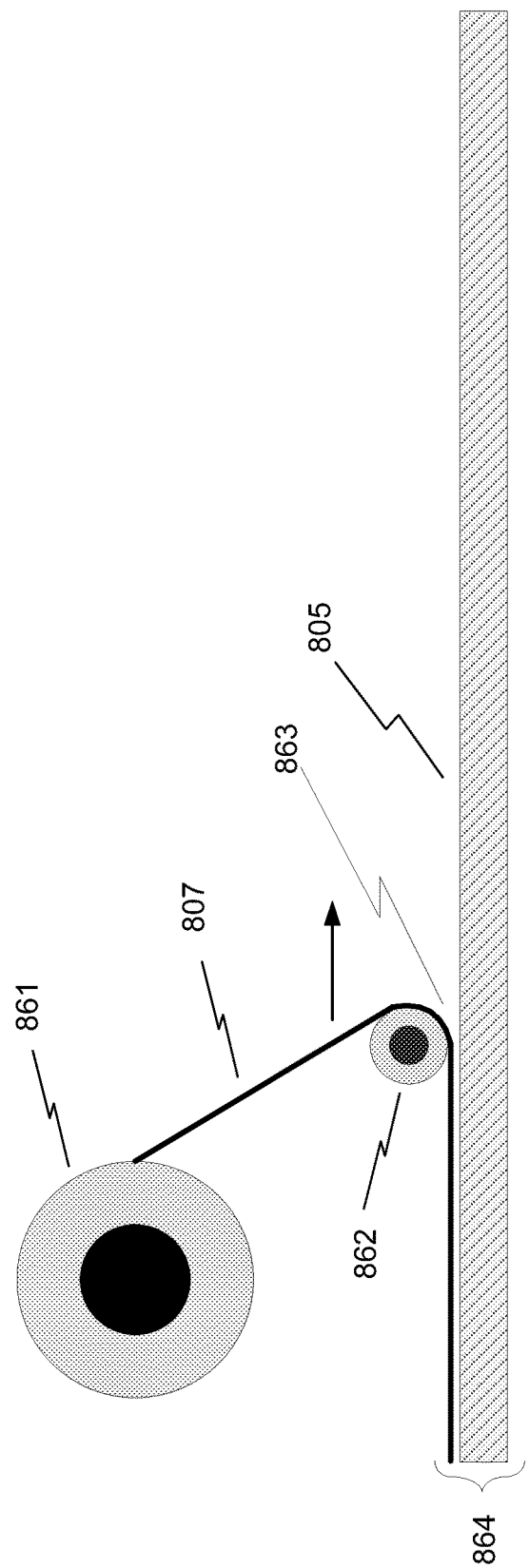
FIGS. 8, 9, 10 and 11 illustrate examples of procedures in the process of laminating components to construct a touch screen assembly as described herein.

FIG. 8 depicts a first procedure in the construction of a touch sensor assembly of the type illustrated in FIG. 1, i.e., the application of optically clear adhesive to the substrate or lower-most component 805 of the touch screen assembly. In the embodiment depicted in FIG. 8 the substrate 805 is a 0.375 inch thick sheet of polycarbonate sized in length and width for the particular application in which the touch sensor will be employed. However, techniques employed herein may also be applied to laminate sheets in a continuous process. Item 861 is a roll containing a wound stock of optically clear adhesive sheet material 807. Again, the sheet should be appropriately sized to correspond to the substrate 805. Although not depicted in the drawing, the adhesive sheet material 807 is a combination of three layers, i.e., an upper backing material or "release" paper and a lower backing material of "release" paper, with the optically clear adhesive material sandwiched between the other two layers. The release papers provide dimensional stability to the adhesive so that it can be manipulated and prevent the adhesive surfaces from sticking to themselves or any other surfaces before being applied to substrate 805. The release papers are not explicitly depicted in FIG. 8 since their use is well known to those skilled in the art of applying such materials.

FIG. 8 depicts the application of the optically clear adhesive to the substrate. The substrate 805 is held in place during that operation. Optically clear adhesive material 807 from roll 861 is pre-wrapped around a small application roller 862. The application roller is initially positioned just to the far left edge of the substrate 805, and is then moved to the right to apply the adhesive. As the application roller is moved and the adhesive 807 begins to be applied, the backing release layer is removed so that the adhesive comes directly into contact with the substrate 805. The upper release layer is removed after application of the adhesive timed as appropriate for presenting a prime adhesive surface in relation to the next lamination procedure, i.e., e.g., that shown in FIG. 9. As the application roller 862 passes across the surface of the substrate 805, the optically clear adhesive material is applied to the substrate.

The application roller 862 should be small in diameter. The smaller the roller 862, the greater the angle 863 between the optically clear adhesive material 807 and the substrate 805 at the point of application. Using a larger angle minimizes the possibility that air will be trapped between the optically clear adhesive material and the surface of 805. The appropriate or best size for the application roller depends on the physical properties of the laminate layers and is best determined empirically. Alternatively, the function of application roller 862 may be provided by a thin, appropriately shaped, e.g., slightly rounded, "blade" in order to maximize the interface angle, yet minimize tearing.

Figure 9:
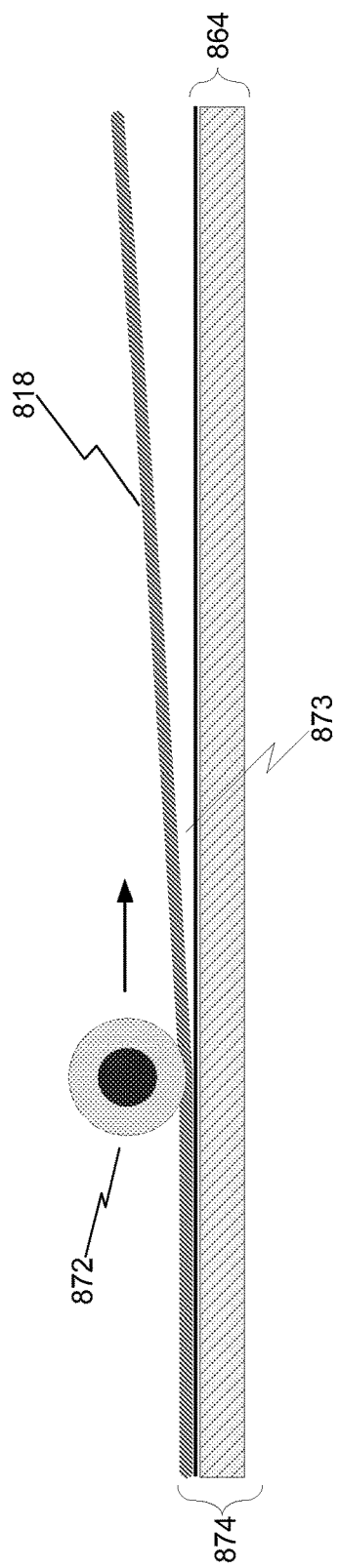

FIG. 9 depicts a process for laminating the adhesive coated substrate 864 with the unit 818 containing touch sensor assembly and window spacer as depicted, for example, in FIG. 4 using the intermediate adhesive material 807 that was applied to the substrate as described with respect to FIG. 8. Prior to the procedure depicted in FIG. 9, the upper release paper has been removed above the adhesive so that an appropriately tacky adhesive surface is presented to the unit 818 as it is laminated onto the substrate 805.

The "unit" 818 to be adhesively bonded to the substrate 805 includes the combination of the window/spacer and the resistive touch sensor subassembly as depicted in FIG. 4, items 416 and 410, respectively. These are separate components, but they will lie adjacent one another in the fully assembled touch screen assembly and, therefore, may be laminated on the same substrate 864 simultaneously. With regard to the lamination process, the window/spacer and the touch sensor assembly are described as a "unit" 818, although it should be appreciated that they are separate but in parallel and side-by-side relationship. Only one of these components can be seen in the side view depicted in FIG. 9, with the other component lying invisibly on the far side. Unless otherwise, noted references to the "unit" 818 in the following description means that separate acts on the "unit" are to be performed on both the window/spacer and the touch sensor assembly. To facilitate the joint, simultaneous lamination of these components, it may be desirable that they be chosen to have relatively similar flexibilities. The construction of these components relative to one another is useful in preventing air bubbles from being trapped as the lamination to the substrate 805 is performed. In one embodiment illustrated here, the spacer window 16 (FIG. 1) may be an appropriate width sheet or strip of polycarbonate that should be the same thickness as the resistive touch sensor subassembly 10 (FIG. 1). If this is not the case, i.e., if the thickness of spacer window varies much from the thickness of the resistive touch sensor subassembly, a natural "pocket" will be created where air will be trapped during subsequent assembly steps. In essence, the bottom surfaces of the window/spacer 16 and the touch sensor assembly 10 should be such that the unit 818 comprising them should present an uninterrupted and uniform plane for bonding to the substrate 805.

Further assembly difficulties are presented by the fact that the unit 818 includes components generally perceived by manufacturers as being incompatible with ordinary lamination processes. In particular the touch sensor assembly 10 is not considered as being flexible, or at least not flexible enough. In any event, neither the polycarbonate spacer window 16 nor a glass-incorporating resistive touch sensor 10 is capable of being bent around a small roller such as roller 862 in FIG. 8.

As noted previously, however, the touch sensor assembly is not absolutely rigid and has enough flexibility to absorb shocks. It has been found that this characteristic also enables a new form of lamination. FIG. 9 illustrates one embodiment of a procedure for laminating the unit 818 with the combination of substrate and adhesive 864 prepared by the process shown in FIG. 8.

In this lamination procedure, the unit 818 is initially positioned with the bottom, left-hand portion of the unit 818 in contact with only the top, left-most edge of the adhesive 807 on substrate 805. This position should be firmly fixed in a manner that encourages the components of unit 818 to retain their respective orientations with one another throughout the lamination process. A the outset, the remainder of the unit 818 forms a very significant angle with the substrate 864—perhaps as much as 90°, but more probably on the order of 20-30° as roughly illustrated at 873 in FIG. 9. This positioning of the unit 818 with the edge of the substrate and adhesive 864 on the left should be firmly fixed mechanically or otherwise to preclude relative movement between these edges as the lamination process proceeds subsequently. The right edge of the unit 818 should also be firmly "grasped" so that it may be lowered toward the surface 864 in a controlled manner.

At first, when the angle 873 between the unit 818 and the surface 864 is still somewhat large, i.e., more than a few degrees, the adhesive 807 on the substrate will tend to cleanly attach to unit 818 as the right edge of unit 818 is lowered. However as the angle between the surfaces unit 818 and 864 becomes less than a few degrees, the tendency to entrap air in the form of bubble becomes more problematic. When the angle 873 between the unit 818 and the surface of 864 becomes very small, air entrapment becomes unavoidable. At that point, lowering of the right edge of unit 818 is discontinued as the sole means for effecting lamination.

As shown in FIG. 9 a roller 872 is then employed beginning at the far left of the laminate in FIG. 9. This roller 872 has a significantly larger diameter than the small application roller 862 described with regard to FIG. 8. Again, the appropriate or best size for the application roller depends on the physical properties of the laminate layers and is best determined empirically. The roller 862 is moved from left to right and is firm enough that a significant force can be applied through the roller to the surface of the unit 818. This takes advantage of the flexibility of the resistive touch sensor subassembly and the window/spacer. Flexibility in the touch sensor assembly is provided if its core substrate is a plastic material, e.g., PET or polycarbonate or other similar material. It may also be provided by a glass substrate, if the glass is of sufficient thinness, for example, approximately 0.7 mm or thinner, to provide some flexing without breaking.

As the roller 872 is moved to the right, the right-hand edge of the touch screen sensor is also lowered to permit flexing of the sensor without breakage or damage.

Initially, roller 872 is to the left of substrate 864 and is positioned above the unit 818. Next, roller 872 is lowered until significant but appropriate pressure applied to the roller begins to compress the left-hand edge of the unit 818 into the adhesive layer 807 on the top of substrate 805. This and the next few steps must be applied very gradually and no faster than the adhesive 807 on the substrate 864 attaches to the bottom portion of unit 818 without entrapping air bubbles. Slowly (as determined empirically by observing the presence of any air bubbles in the resulting product(s)) roller 872 is advanced to the right until the unit 818 has deformed sufficiently but less than the point at which any component is damaged. This amount of deflection (i.e., the "bowing" of the unit 818 between the right edge and the application roller 872—an example of which is illustrated in FIG. 9—may best be determined by trial and error experimentation using the actual components intended for production.

Once this point of deflection in the unit 818 has been reached, a coordinated sequence of slow rightward movement of roller 872 along with additional lowering of the right edge of unit 818 will commence and continue until the right edge of unit 818 descends to the upper surface of 864. It is critical that the right edge of unit 818 be lowered in a coordinated manner with the movement of roller 872 to keep the internal stress of the unit 818, especially the touch sensor assembly, below the point where any permanent damage will occur. At this point the support for the right edge of unit 818 is removed and roller 872, which, at this point, will still be somewhat to the left of the right side edge of unit 818, will advance to the right completely over and further seal unit 818 to item 864.

Among other things, the procedure just described above continuously displaces a small amount of the adhesive layer 807 to the right so that this displaced material will, in effect, meet the approaching surface of unit 818 at the actual point of interface with the substrate 864. In essence a mini-"wave" of displaced adhesive material (like toothpaste being pushed from a tube as the sides of the tube are compressed) is extruded in front of the approaching meeting point of the unit 818 and the substrate 864. If the movement of the roller 872 is slow enough, this extruded adhesive will have time to meet and attach to the bottom of the unit 818 without entrapping much, if any, air as bubbles. FIG. 9A is an enlarged window into the process depicted in FIG. 9 showing the movement of adhesive in advance of lamination. Item 808 represents the mini-wave of adhesive that is pushed upward and outward as the surfaces 818 and 864 are laminated.

It is anticipated that the process depicted in FIG. 9 will be conducted at ambient conditions, typically in a "clean room" or a localized area where dust is controlled, e.g., by air filtration. But it may be advantageous to slightly elevate the temperature of the substrate 805 and/or the unit 818 to facilitate the flow of the adhesive 806 as it is "extruded" in advance of the contacting of these two components. In addition or alternatively, the method depicted in FIG. 9 could be performed in a chamber in which a significant portion of the air has been evacuated. This has the clear advantage of reducing the number of air molecules available per unit volume in the environment, so that any bubbles that do get trapped in the laminate will contain fewer molecules in each instance. Further, any residual air bubbles would become smaller once the assembly is restored to normal atmospheric pressure.

Finally the procedure depicted in FIG. 9 could be performed while removing air molecules from the immediate vicinity of the joining of surfaces 818 and 864. For example, air molecules could be displaced with a low viscosity liquid, such as a liquid chemically compatible with the optically clear adhesive material. Thus, a portion of the liquid could beneficially, or at least not detrimentally, remain as part of the final touch screen assembly without adversely affecting the adhesive bond between the optically clear adhesive 807 with the bottom of touch sensor assembly V6.

The procedure depicted in and described with respect to FIGS. 9 and 9A comprises the most difficult part of constructing the overall touch screen assembly.

Figure 10:
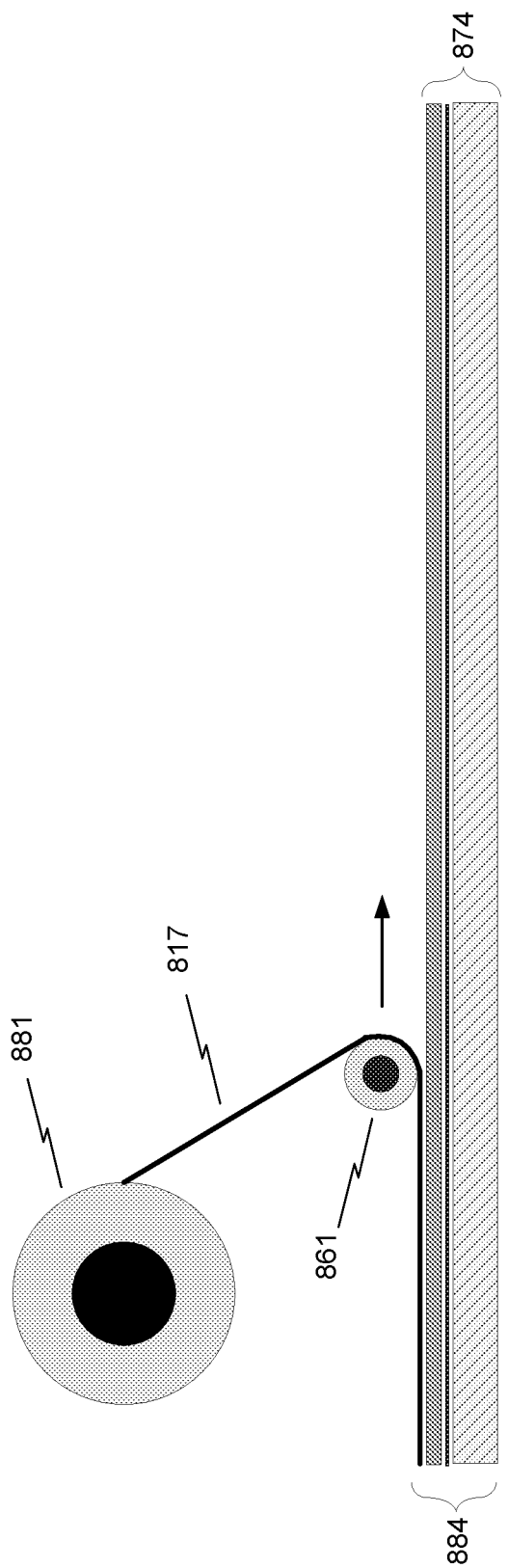

FIG. 10 illustrates one embodiment for performing the next step in the construction of the touch screen assembly, i.e., applying a layer of adhesive 817 to the laminate 874 formed as a result of the processes in FIGS. 8 and 9. The laminate 874 comprises substrate 805, first adhesive layer 807 and unit 818, which includes the touch sensor assembly and window/spacer. The optically clear adhesive 817 is applied to the laminate 874 via the same or substantially the same process depicted in and described with respect to FIG. 8. Adhesive material 817 is unwound from stock spool 881 and is wound around small application roller 861 as it applies the adhesive to the upper surface of the 874 laminate.

Figure 11:
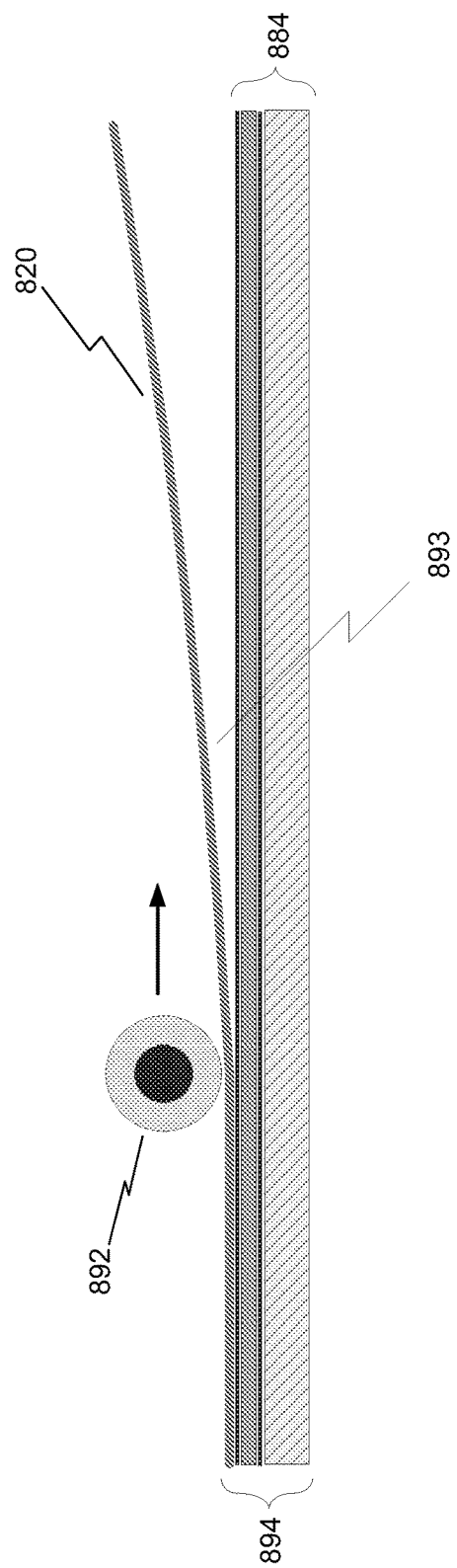

The final step in the construction of the touch screen assembly is the application of the uppermost layers to the laminate 884 formed as a result of the procedures depicted in FIGS. 8, 9 and 10. That laminate 884 comprises substrate 805, first adhesive layer 807, unit 818 (which includes the touch sensor assembly and the window/spacer), and second adhesive layer 817. The final material to be added on top of that laminate 884 and bonded thereto is the thick protective layer to which the black-out mask has been previously applied on the bottom and to which the surface coatings or other finishing layers have been applied to the top. (See, e.g., FIG. 4, items 419, 420, and 421.) This coated protective layer, collectively depicted as item 820 in FIG. 11, is prepared in a size matching the underlying laminate 884. Due to the thickness of the protective layer, this composite 820 presents many of the same lamination issues and difficulties as were described with respect to the joinder of unit 818 to substrate 805 previously. However, the issues in the final construction step can be resolved using a lamination process the same or similar to that depicted in and described with respect to FIG. 9. It should be noted, however, that if there is any difference in the height of the touch sensor assembly and the window/spacer, the lamination procedure depicted in FIG. 9, may result in leveling those components at the bottom and transferring the disparity in their respective heights to the top of these components. This would result in an uneven surface of 884 that may affect the lamination of the composite 820 on top of the touch sensor assembly and the window/spacer. The application of a mask layer is to the bottom exterior of the protective layer may assist in minimizing problems from any small disparity in heights during that lamination.

One embodiment of a procedure for lamination composite protective layer 820 onto the previously formed laminate 884 is depicted in FIG. 11. Large application roller 892 here serves a function similar to that of 872 of FIG. 9 and operates in a similar manner in coordination with a similar support for the right edge of laminated protective layer 820.

The lamination operation depicted in FIG. 11 is very similar to that depicted in and described with respect to FIG. 9 where a small "wave" of extruded adhesive is pushed into the interface of coated protective layer 820 and laminate 884. The significant difference is that item 820 is greatly more flexible than the unit 818, at least in the case of a thick (i.e., 0.02 inch) polycarbonate protective layer. As a result, the diameter of roller 892 may be considerably less than the diameter of roller 872 show in FIG. 9. And the right edge of the coated protective layer 820, although still coordinated with the movement of 892, may be maintained at a much greater angle 893 relative to laminate 884 than angle 873 in FIG. 9. All this means that the process depicted in FIG. 11 may be accomplished at a significantly higher rate than that associated with the process depicted in FIG. 9.

Additional steps which are not depicted are, or may be, dependent upon the actual optically clear adhesive materials utilized as some materials may require, for example, an ultra-violet (UV) curing step which will be known to those skilled in the art.

Depending on the materials employed and their thicknesses, it may be desirable in some instances to perform the lamination in reverse order, i.e., beginning with the placement of adhesive 17 onto the protective layer 20; followed by the lamination of the touch sensor 10 and the window/spacer onto that combination; then the addition of the adhesive 7; and finally the lamination of the substrate 5 onto the prior composite.

The preceding description discusses multiple embodiments of the invention. As will be understood by one having skill in the art, many of these embodiments are combinable with one another and should not necessarily be viewed as distinct alternatives to one another. Similar embodiments may also be made or performed without departing from the spirit and scope of the invention described herein. Accordingly, the invention is defined by the claims below.

Advantages

Some advantages of the present invention can be appreciated when considering a touch screen assembly in an integrated services access module such as depicted in and described briefly with respect to FIG. 6. The touch screen assembly provides the user interface for the product. The touch screen assembly allows a user to access services remotely by providing a means of inputting data and commands on a touch sensitive screen and also provides visual and audible feedback to the user. The touch panel assembly is the key user interface component of the integrated services access module and this component serves several purposes:

Embodiments of the invention provide an input device (touch sensor) that senses the touch of a pointing device or finger which results in an X and Y coordinate that is communicated to a microprocessor that interprets and acts on the action. It provides a transparent window that allows the user to view an electronic, e.g., LCD, display behind the touch panel assembly and protects the LCD. Protection is provided by a thick, protective front cover as the outermost layer of the touch sensor assembly which acts as an environmental barrier, mar/abrasion resistant surface, and a barrier to unauthorized access to the touch sensor and other internal components. Further protection to blows or shocks is provided by the flexibility of various components. Underneath the flexible layers is a firm but slightly flexible supporting backer to prevent the touch sensor from excessive flexing. There is at least one space between layers that permits one or more flexible layers to bend in response to a blow or shock.

The touch screen assembly provides a unified component that is easy to insert during the final assembly of the integrated services access module—instead of manually stacking the components within the housing of the module. The unified component is designed and sized such that it is automatically aligned properly with respect the housing of the integrated services module during the assembly process without the need for adjustment.

In addition to providing durability, the outer layer on the screen provides a certain amount of privacy, i.e., one looking at the screen from beyond about 45° to perpendicular cannot see what is on the screen.

We claim:

1. A durable, yet sensitive, touch screen for use in an electronic device to enable a user to view and select from images presented by the touch screen comprising:
   (a) a display screen for projecting images to a user in a presentation area;
   (b) a touch screen assembly comprising:
      (1) an optically clear, flexible touch sensor through which the images are projected by the display screen, wherein the touch sensor has a front side facing opposite the display screen and a back side facing the display screen, and wherein the touch sensor comprises:
         a first flexible contact surface comprising a thin flexible support layer having a front side facing opposite the display screen and a back side facing the display screen, wherein the back side of the thin flexible support layer includes a first electrical contact coating associated with a first conductive printed wiring circuit;
         a second flexible contact surface, located between the first flexible contact surface and the display screen, comprising a support layer having a front side facing the first flexible contact surface and a back side facing the display screen, wherein the front side of the support layer includes a second electrical contact coating associated with a second conductive printed wiring circuit; and
         wherein the first and second contact surfaces are separated by an arrangement of deformable particles;
      (2) a durable polycarbonate protective layer, said polycarbonate protective layer being at least 0.01 inch thick and being attached in front of the touch sensor so that a user touch to the durable polycarbonate protective layer activates an area of the touch sensor by deforming particles associated with that area so that the first and second electrical coatings contact each other in the area of the touch; and (3) an optically clear, flexible substrate positioned between the display screen and the flexible touch sensor to support the flexible touch sensor; and (c) a space between the flexible substrate and the display screen sufficient to enable the substrate and the touch sensor to flex toward the display screen in response to an impact to the touch screen assembly.

2. The touch screen of claim 1 wherein the polycarbonate protective layer is about 0.02 to 0.06 inch thick.

3. The touch screen of claim 2 wherein the polycarbonate protective layer is substantially free of intervening features that would distort or otherwise impair visibility.

4. The touch screen of claim 1 wherein the optically clear, flexible substrate is polycarbonate 0.375 inch thick.

5. The touch screen of claim 1 wherein the optically clear, flexible substrate is polycarbonate between about 0.2 to 0.5 inch thick.

6. The touch screen of claim 2 wherein the first flexible contact surface comprises a flexible sheet of glass about 0.4 mm to 0.7 mm thick.

7. The touch screen of claim 1 wherein the first flexible contact surface is a polymer sheet.

8. The touch screen of claim 7 wherein the polymer sheet is polyethylene terephthalate about 0.005 to 0.007 inch thick.

9. The touch screen of claim 1 wherein the second flexible contact surface has a support layer comprising polyethylene terephthalate from about 0.001 inch to 0.007 inch thick.

10. The touch screen of claim 1 wherein the first electrical contact coating and the second electrical contact coating comprise particles of indium tin oxide.

11. The touch screen of claim 1 wherein the space between the flexible substrate and the display screen is created by a gasket between the substrate and the periphery of the electronic display screen.

12. The touch screen of claim 11 wherein the gasket is comprised of compressible foam.

13. The touch screen of claim 1 wherein the flexible touch sensor assembly has an active area for detecting a touch larger than the presentation area of the display device.

14. The touch screen of claim 1 wherein the deformable particles comprise silicone spheres.

15. The touch screen of claim 2 wherein the polycarbonate protective layer is attached by an optically clear adhesive to the front side of the flexible touch sensor.

16. An electronic device having a touch screen configured for shock absorption, comprising:
    a rigid non-flexible front housing;
    a thick protective layer having a thickness of 0.01-0.06 inches attached to a resistive touch sensor assembly housed in the rigid non-flexible front housing, wherein the resistive touch sensor assembly comprises:
        a first flexible sheet having a first side attached to the thick protective layer and a second side having a coating of indium-tin-oxide (ITO);
        a second flexible sheet having a first side facing the second side of the first flexible sheet and a second side facing opposite the first side, wherein the first side of the second flexible sheet has a coating of ITO;
        a frame spacer separating the first flexible sheet and the second flexible sheet; and
        a plurality of deformable particles separating the first flexible sheet and the second flexible sheet;
        wherein the first flexible sheet is configured to, upon receipt of a touch to the thick protective layer, contact the second flexible sheet;
    a firm substrate layer attached to the resistive touch sensor assembly; and
    a screen spaced apart from the firm substrate layer such that images displayed from the screen pass through firm substrate layer, the resistive touch sensor assembly, and the thick protective layer, wherein a gap is formed between the screen and the firm substrate layer to allow the firm substrate layer to flex into the gap without contacting the screen.

17. The electronic device of claim 16, wherein the electronic device further comprises a spacer located between the first substrate layer and the screen.

18. The electronic device of claim 16, wherein the resistive touch sensor assembly extends laterally beyond the screen, wherein an area of the resistive touch sensor assembly that extends beyond the screen is an over-hang area.

19. The electronic device of claim 16, further comprising a static image behind the over-hang area, the static image being associated with a function of the electronic device.

20. The electronic device of claim 16, wherein the electronic device further comprises a rear housing configured to be mounted to a wall, wherein the rear housing is configured to attached to the rigid non-flexible front housing.

\* \* \* \* \*